United States Patent
Sahni et al.

(10) Patent No.: US 7,444,318 B2
(45) Date of Patent: Oct. 28, 2008

(54) PREFIX PARTITIONING METHODS FOR DYNAMIC ROUTER TABLES

(75) Inventors: Sartaj Kumar Sahni, Gainesville, FL (US); Haibin Lu, Columbia, MO (US)

(73) Assignee: University of Florida Research Foundation, Inc., Gainesville, FL (US)

(*) Notice: Subject to any disclaimer, the term of this patent is extended or adjusted under 35 U.S.C. 154(b) by 994 days.

(21) Appl. No.: 10/719,914

(22) Filed: Nov. 21, 2003

(65) Prior Publication Data

US 2004/0258061 A1 Dec. 23, 2004

(51) Int. Cl.
*G06F 7/00* (2006.01)
*G06F 17/30* (2006.01)

(52) U.S. Cl. .................. 707/2; 707/101; 707/102
(58) Field of Classification Search .......... 370/389, 370/401, 392; 709/238, 247; 707/2, 101, 707/102
See application file for complete search history.

(56) References Cited

U.S. PATENT DOCUMENTS

| | | | |
|---|---|---|---|
| 4,251,861 A | 2/1981 | Mago | |
| 4,833,468 A | 5/1989 | Larson et al. | |
| 5,546,390 A | 8/1996 | Stone | |
| 5,555,405 A | 9/1996 | Griesmer et al. | |
| 5,701,467 A | 12/1997 | Freeston | |
| 5,761,440 A | 6/1998 | De Marco et al. | |
| 5,787,430 A | 7/1998 | Doeringer et al. | |
| 5,909,440 A | 6/1999 | Ferguson et al. | |
| 5,978,795 A | 11/1999 | Poutanen et al. | |
| 6,018,524 A * | 1/2000 | Turner et al. | 370/392 |
| 6,021,131 A | 2/2000 | Even | |
| 6,041,053 A | 3/2000 | Douceur et al. | |
| 6,061,712 A | 5/2000 | Tzeng | |
| 6,092,072 A | 7/2000 | Guha et al. | |
| 6,157,955 A | 12/2000 | Narad et al. | |
| 6,212,184 B1 | 4/2001 | Venkatachary et al. | |

(Continued)

OTHER PUBLICATIONS

Degermark, Mikael, et al. (1997) "Small Forwarding Tables for Fast Routing Lookups" *ACM SIGCOMM Proceedings of the ACM SIGCOMM '97 conference on Applications, technologies, architectures, and protocols for computer communication.* pp. 3-14.

(Continued)

*Primary Examiner*—Seema S. Rao
*Assistant Examiner*—Sai-Ming Chan
(74) *Attorney, Agent, or Firm*—Saliwanchik, Lloyd & Saliwanchik

(57) ABSTRACT

A method is provided to improve the performance of dynamic router-table designs. Specifically, the invention relates to a method and system for partitioning prefixes at each node of a partitioning tree into $2^s+1$ partitions using the next s bits of the prefixes. Prefixes that have a length less than s are placed into partition $-1$, with the remaining prefixes falling into the remaining partitions that correspond to the value of their first s bits. Prefix partitioning may be controlled using either static rule tables or by dynamic rule tables. In one embodiment, binary tree on binary tree (BOB) data structures are applied to a partition of the present invention. In another embodiment, prefix binary tree on binary tree (PBOB) data structures are applied to a partition of the present invention. In a further embodiment, a dynamic longest-matching prefix binary tree on binary tree-table (LMPBOB) is applied to a partition of the present invention.

14 Claims, 27 Drawing Sheets

U.S. PATENT DOCUMENTS

| | | |
|---|---|---|
| 6,266,706 B1 | 7/2001 | Brodnik et al. |
| 6,289,013 B1 | 9/2001 | Lakshman et al. |
| 6,335,932 B2 | 1/2002 | Kadambi et al. |
| 6,341,130 B1 | 1/2002 | Lakshman et al. |
| 6,353,873 B1 | 3/2002 | Melchior |
| 6,366,582 B1 * | 4/2002 | Nishikado et al. ............ 370/401 |
| 6,392,842 B1 | 5/2002 | Boutaghou et al. |
| 6,522,632 B1 | 2/2003 | Waters et al. |
| 6,533,370 B2 | 4/2003 | Andreev et al. |
| 6,563,823 B1 | 5/2003 | Przygienda et al. |
| 6,581,106 B1 | 6/2003 | Crescenzi et al. |
| 6,611,832 B1 | 8/2003 | van Lunteren |
| 6,675,157 B1 | 1/2004 | Mitchell |
| 6,681,218 B1 | 1/2004 | Zou |
| 6,728,705 B2 * | 4/2004 | Licon et al. ..................... 707/3 |
| 6,944,598 B1 | 9/2005 | Cline |
| 7,113,581 B2 | 9/2006 | Benedyk et al. |
| 2002/0009076 A1 | 1/2002 | Engbersen et al. |
| 2003/0123387 A1 | 7/2003 | Jackson |
| 2004/0141509 A1 | 7/2004 | Sahni et al. |

OTHER PUBLICATIONS

Doeringer, W., G. Karjoth, and M. Nassehi (1996) "Routing on longest-matching prefixes" *IEEE/ACM Transactions on Networking*, 4(1): pp. 86-87.

Ergun, Funda, et al. (2001) "A Dynamic Lookup Scheme for Bursty Access Patterns" *Proceedings of IEEE INFOCOM* pp. 1-10.

Gupta, P. and N. McKeown (2000) "Dynamic algorithms with worst-case performance for packet classification" *IFIP Networking* pp. 528-539.

Lampson, Butler, Venkatachary Srinivasan, and George Varghese (Jun. 1999) "IP Lookups Using Multiway and Multicolumn Search" *IEEE/ACM Transactions on Networking vol. 7*, No. 3, pp. 324-334.

Lu, H. and Sahni, S. (2003) "O (log $n$) dynamic router-tables for prefixes and ranges" *IEEE Symposium on Computers and Communications* pp. 1-42.

Nilsson, Stefan and Gunnar Karlsson (1998) "Fast address lookup for Internet routers" *Proceedings of IEEE Broadband Communications* (enclosed copy pages numbered 9-18).

Ruiz-Sanchez, M., E. Biersack, and W. Dabbous (Mar./Apr. 2001) "Survey and taxonomy pf IP address lookup algorithms" *IEEE Network*, 15(2): pp. 8-23.

Sahni, Sartaj and Kun Suk Kim "Data Structures of IP Lookup with Bursty Access Patterns" www.cise.ufl.edu/-sahni (enclosed copy pages numbered 1-5).

Sahni, Sartaj and Kun Suk Kim (2001) "Efficient Construction of Fixed-Stride Multibit Tries for IP Lookup" *Proceedings of 8th IEEE Workshop on Future Trends of Distributed Computing Systems* pp. 178-184 (enclosed copy pages numbered 1-7).

Sahni, Sartaj and Kun Suk Kim (2002) "Efficient Construction of Variable-Stride Multibit Tries for IP Lookup" *Proceedings of IEEE Symposium on Applications and the Internet* (SAINT) pp. 220-229 (enclosed copy pages numbered 1-8).

Sahni, Sartaj and Kun Suk Kim (Jul. 2002) "O(log n) Dynamic Packet Routing" 7th *IEEE Symposium on Computers and Communications*. pp. 1-29.

Sahni, Sartaj, Kun Suk Kim, and Haibin Lu (May 2002) "Data Structures for One-Dimensional Packet Classification Using Most-Specific-Rule Matching" *International Symposium on Parallel Architectures, Algorithms, and Networks* (ISPAN) pp. 3-14 (enclosed copy pages numbered 1-12).

Sklower, Keith (1991) "A Tree-Based Packet Routing Table for Berkeley Unix" *Proceedings of 1991 Winter USENIX Conference* pp. 93-99 (enclosed copy pages numbered 1-4).

Srinivasan, V. and G. Varghese (Feb. 1999) "Faster IP Lookups Using Controlled Prefix Expansion" *ACM Transactions on Computer Systems* vol. 17, issue 1, pp. 1-40 (enclosed copy pages numbered 1-21).

Suri, S., G. Varghese, and P. Warkhede (2001) "Multiway range trees: Scalable IP lookup with fast updates" *Proceedings of Globecom '01*.

Waldvogel, Marcel et al. (1997) "Scalable High Speed IP Routing Lookups" *Proceedings of the ACM SIGCOMM '97 Conference on Applications, technologies, architectures, and protocols for computer communication*. pp. 25-36 (enclosed copy pages numbered 1-12).

Afek, Y. et al. (Dec. 14, 1999) "Routing with a Clue" *ACM SIGCOMM*, pp. 203-214 (enclosed copy pages No. 0-23).

Berg, M. Krevald and J. Snoeyink (1995) "Two- and Three-dimensional Point Location in Rectangular Sub-divisions" *Journal of Algorithms*. vol. 18, No. 2, pp. 256-277.

Chandranmenon, G. and Varghese, G. (1996) "Trading Packet Headers for Packet Processing" *IEEE Transactions on Networking*. vol. 4, No. 2, pp. 141-152 (enclosed copy pages numbered 1-13).

Cheung and McCanne. (1999) "Optimal Routing Table Design for IP Address Lookups under Memory Constraints," *IEEE INFOCOM*. pp. 1437-1444.

Hari, A. et al. (2000) "Detecting and Resolving Packet Filter Conflicts" *IEEE INFOCOM*. pp. 1203-1212.

Macian, C. and R. Finthammer. (2001) "An Evaluation to the Key Design Criteria to Achieve High Update Rates in Packet Classifiers" *IEEE Network*. Nov./Dec. pp. 24-29 (enclosed copy pages numbered 1-10).

McAuley, A. and P. Francis.(1993) "Fast Routing Table Lookups Using CAMs" *IEEE INFOCOM*. vol. 3 Mar./Apr., pp. 1382-1391.

McCreight, E. (1985). "Priority Search Trees" *SIAM Jr. on Computing*. vol. 14, No. 1, pp. 257-276.

Newman, P. et al. (Jan. 1997) "IP Switching and Gigabit Routers" *IEEE Broadband Communications Magazine*. vol. 35, pp. 64-69 (enclosed copy pages numbered 1-8).

U.S. Appl. No. 10/426,423, filed Apr. 30, 2003 (Inventors: Santaj Kumar Sahni, Haibin Lu), application attached.

Office Action dated Dec. 12, 2007 in U.S. Appl. No. 10/426,423, filed Apr. 30, 2003.

Office Action dated Mar. 18, 2008 in U.S. Appl. No. 10/718,842, filed Nov. 21, 2003.

* cited by examiner $P2 = 1*$
$P3 = 11*$
$P4 = 101*$
$P5 = 10001*$
$P6 = 1100*$
$P7 = 110000*$
$P8 = 1100000*$ $001 * (P1b)$
$010 * (P1c)$
$011 * (P1d)$
$100 * (P2)$
$101 * (P4)$
$110 * (P3a)$
$111 * (P3b)$
$10001 * (P5)$
$11000 * (P6a)$
$11001 * (P6b)$
$1100000 * (P8)$
$1100001 * (P7)$

| Database | | Paix1 | Pb1 | MaeWest | Aads | Pb2 | Paix2 |
|---|---|---|---|---|---|---|---|
| Num of Prefixes | | 16172 | 22225 | 28889 | 31827 | 35303 | 85988 |
| Measure1 (KB) | PST | 884 | 1215 | 1579 | 1740 | 1930 | 4702 |
| | BOB | 851 | 1176 | 1526 | 1682 | 1876 | 4527 |
| | PBOB | 357 | 495 | 642 | 708 | 790 | 1901 |
| | LMPBOB | 357 | 495 | 642 | 708 | 790 | 1901 |
| Measure2 (KB) | PST | 221 | 303 | 395 | 435 | 482 | 1175 |
| | BOB | 331 | 455 | 592 | 652 | 723 | 1760 |
| | PBOB | 189 | 260 | 338 | 372 | 413 | 1007 |
| | LMPBOB | 189 | 260 | 338 | 372 | 413 | 1007 |

| Database | | | Paix1 | Pb1 | MaeWest | Aads | Pb2 | Paix2 |
|---|---|---|---|---|---|---|---|---|
| Search (μsec) | PST | Mean | 1.20 | 1.35 | 1.49 | 1.53 | 1.57 | 1.96 |
| | | Std | 0.01 | 0.01 | 0.04 | 0.01 | 0.00 | 0.01 |
| | BOB | Mean | 1.22 | 1.39 | 1.54 | 1.56 | 1.62 | 2.19 |
| | | Std | 0.01 | 0.02 | 0.02 | 0.02 | 0.02 | 0.01 |
| | PBOB | Mean | 0.82 | 0.98 | 1.10 | 1.15 | 1.20 | 1.60 |
| | | Std | 0.01 | 0.01 | 0.01 | 0.01 | 0.01 | 0.01 |
| | LMPBOB | Mean | 0.87 | 1.03 | 1.17 | 1.21 | 1.27 | 1.69 |
| | | Std | 0.01 | 0.01 | 0.01 | 0.01 | 0.01 | 0.01 |
| Insert (μsec) | PST | Mean | 2.17 | 2.35 | 2.53 | 2.60 | 2.64 | 3.03 |
| | | Std | 0.07 | 0.04 | 0.03 | 0.01 | 0.05 | 0.01 |
| | BOB | Mean | 1.70 | 1.89 | 2.06 | 2.10 | 2.16 | 2.55 |
| | | Std | 0.06 | 0.06 | 0.05 | 0.05 | 0.05 | 0.03 |
| | PBOB | Mean | 1.04 | 1.25 | 1.39 | 1.44 | 1.51 | 1.93 |
| | | Std | 0.06 | 0.05 | 0.00 | 0.05 | 0.05 | 0.06 |
| | LMPBOB | Mean | 1.06 | 1.29 | 1.47 | 1.50 | 1.57 | 1.98 |
| | | Std | 0.07 | 0.07 | 0.06 | 0.06 | 0.04 | 0.01 |
| Delete (μsec) | PST | Mean | 1.72 | 1.87 | 2.06 | 2.09 | 2.11 | 2.48 |
| | | Std | 0.04 | 0.05 | 0.05 | 0.06 | 0.04 | 0.06 |
| | BOB | Mean | 1.04 | 1.13 | 1.26 | 1.27 | 1.32 | 1.69 |
| | | Std | 0.06 | 0.05 | 0.04 | 0.05 | 0.06 | 0.06 |
| | PBOB | Mean | 0.68 | 0.82 | 0.90 | 0.91 | 0.97 | 1.30 |
| | | Std | 0.07 | 0.06 | 0.05 | 0.06 | 0.03 | 0.05 |
| | LMPBOB | Mean | 0.67 | 0.82 | 0.89 | 0.92 | 0.95 | 1.26 |
| | | Std | 0.06 | 0.06 | 0.05 | 0.05 | 0.03 | 0.05 |
| Num of Copies | | | 15 | 11 | 9 | 8 | 8 | 3 |

FIG. 21

PREFIX PARTITIONING METHODS FOR DYNAMIC ROUTER TABLES

GOVERNMENT SUPPORT

This invention was made in part with funding under a funding grant, No. CCR9912395, from the National Science Foundation. The government has certain rights in the invention.

CROSS-REFERENCE TO RELATED APPLICATION

This application claims the benefit of U.S. Provisional Application No. 60/393,445, filed Jul. 3, 2002 and U.S. patent application Ser. No. 10/613,963, filed Jul. 3, 2003.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to packet routing in dynamic router tables, specifically, to a method and system for prefix partitioning for dynamic-router tables.

BACKGROUND OF THE INVENTION

With the doubling of Internet traffic every three months and the tripling of Internet hosts every two years, routers continuously need to increase packet forwarding rates while still allowing for quick adaptation to routing changes. Internet routers classify incoming packets into a set of packets that are to be treated similarly for routing purposes (also known as "flows") utilizing information contained in packet headers and a table of rules. This table is called the "rule table" or "router table." The packet-header information that is used to perform the classification is some subset of the source and destination addresses, the source and destination ports, the protocol, protocol flags, type of service, and so on. The specific header information used for packet classification is governed by the rules in the rule table.

Each rule-table is a pair of the form (F,N), also known as a tuple, where F is a filter and N is the next action (i.e., hop) for the packet. Typically, each filter is a destination address prefix and longest-prefix matching is used to determine the next hop for each incoming packet. That is, when a packet arrives at a router, its next hop is determined by the rule that has the longest prefix (i.e., filter) that matches the destination address of the packet. Generally, the length of a router-table prefix cannot exceed the length W of a destination address. In IPv4, destination addresses are W=32 bits long, and in IPv6, W=128.

In a static rule table, the rule set does not vary in time. For these tables, problems are often associated with the time required to search the rule table for the rule to use; the preprocessing time needed to create the rule-table data structure; and the amount of memory required by the rule-table data structure. In practice, rule tables are seldom truly static. At best, rules are rarely added to or deleted from the rule table because the rule-table data structure has to be reconstructed whenever a rule is added or deleted.

In contrast, in a dynamic rule table, rules are added/deleted with some frequency. For such tables, inserts/deletes are not batched. Rather, they are performed in real time. For such tables, the time required to insert/delete a rule is a concern. For a dynamic rule table, the initial rule-table data structure is constructed by starting with empty data structures and then inserting the initial set of rules into the data structure one by one. Consequently, in the case of dynamic tables, the preprocessing time is very closely related to the insert time.

Several trie-based data structures for prefix-router tables have been proposed (Sklower, K., "A tree-based routing table for Berkeley Unix," Technical Report, University of California, Berkeley (1993); Degermark, M. et al., "Small forwarding tables for fast routing lookups," *ACM SIGCOMM*, 3-14 (1997); Doeringer, W. et al., "Routing on longest-matching prefixes," *IEEE/ACM Transactions on Networking*, 4, 1:86-97 (1996); Nilsson, S. and G. Karlsson, "Fast address look-up for Internet routers," *IEEE Broadband Communications* (1998); Srinivasan, V. and G. Varghese, "Faster IP lookups using controlled prefix expansion," *ACM Transactions on Computer Systems*, 1-40 (1999); Sahni, S. and K. Kim, "Efficient construction of fixed-stride multibit tries for IP lookup," *Proceedings $8^{th}$ IEEE Workshop on Future Trends of Distributed Computing Systems* (2001); Sahni, S. and K. Kim, "Efficient construction of variable-stride multibit tries for IP lookup," *Proceedings IEEE Symposium on Applications and the Internet (SAINT)*, 220-227 (2002)). Some of the proposed structures perform dynamic router-table operations (lookup, insert; delete) in O(W) time. Others attempt to optimize lookup time and memory requirement through an expensive preprocessing step. These structures, while providing very fast lookup capability, have a prohibitive insert/delete time and so, they are suitable only for static router-tables (i.e., tables into/from which no inserts and deletes take place).

Another proposed scheme performs a binary search on hash tables organized by prefix length (Waldvogel, M., "Scalable high speed IP routing lookups," *ACM SIGCOMM*, 25-36 (1997)). This binary-search scheme has an expected complexity of O(log W) for lookup. An alternative adaptation of binary search to longest-prefix matching uses a multi-way and multicolumn search (Lampson, B., et al., "IP lookup using multi-way and multicolumn search," *IEEE INFOCOM* (1998)). Using this adaptation, a lookup in a table that has n prefixes takes O(W+log n)=O(W) time. Because both schemes also use expensive precomputation, they are not suited for dynamic router-tables.

A B-tree data structure for dynamic router tables has been proposed (Suri, S. et al., "Multiway range trees: Scalable IP lookup with fast updates," *GLOBECOM* (2001)). Using the B-tree data structure, the longest matching-prefix, lmp(d), can be found in O(log n) time. However, inserts/deletes take O(W log n) time. When W bits fit in O(1) words (as is the case for IPv4 and IPv6 prefixes) logical operations on W-bit vectors can be done in O(1) time each. In this case, the scheme takes O(log W log n) time for an insert and O(W+long n)=O(W) time for a delete. The number of cache misses that occur when the data structure is used is O(log n) per operation.

Data structures have been developed called a collection of red-black trees (CRBT) and alternate collection of red-black trees (ACRBT) which support the three operations of a dynamic router-table (longest matching-prefix, prefix insert, prefix delete in O(log n) time each. (Sahni, S. and K. Kim, "O(log n) dynamic packet routing," *IEEE Symposium on Computers and Communications* (2002)). The number of cache misses in each structure is also O(log n). Like the original biased-skip list structure of Ergun, F. et al. ("A dynamic lookup scheme for bursty access patterns," *IEEE INFOCOM* (2001)), CRBT and ACRBT adapt so as to perform lookups faster for bursty access patterns than for non-bursty patterns. The ACRBT structure may also be adapted to obtain a collection of splay trees structure, which performs the three dynamic router-table operations in O(log n) amortized time and which adapts to provide faster lookups for bursty traffic.

Priority search trees have also been used to arrive at an O(log n) data structure for dynamic prefix-tables. This structure is faster than the CRBT structure described above. A data structure that employs priority search trees and red-black trees for the representation of rule-tables in which the filters are a conflict-free set of ranges has also been proposed. This data structure permits most-specific-range matching as well as range insertion and deletion to be done in O(log n) time each.

Data structures BOB (binary tree on binary tree) have also been developed for dynamic router-tables in which the rule filters are non-intersecting ranges and in which the ties are broken by selecting the highest-priority rule that matches a destination address. Using BOB, the highest-priority rule that matches a destination address may be found in $O(log^2 n)$ time; a new rule may be inserted and an old one deleted in O(log n) time. Related structures PBOB (prefix BOB) and LMPBOB (longest matching-prefix BOB) are proposed for highest-priority prefix matching and longest-matching prefixes. These structures apply when all filters are prefixes. The data structure LMPBOB permits longest-prefix matching in O(T) time; rule insertion and deletion take O(log n) time each. On practical rule tables, BOB and PBOB perform each of the three dynamic-table operations in O(log n) time and with O(log n) cache misses. The number of cache misses incurred by LMP-BOB is also O(log n).

In addition to prefix routing, range routing can also be used. In a range router-table, each rule is a range of destination addresses. Several criteria have been proposed to select the best rule that matches a given destination address—first matching-rule in table, highest-priority rule that matches the address, and so on. Two data structures have been developed for dynamic range-router-tables—heap on TRIE (HOT) and binary search tree on TRIE (BOT) (see Gupta and McKeown, "Dynamic algorithms with worst-case performance for packet classification," *IFIP Networking* (2000)). Both of these data structures are for cases when the best-matching rule is the highest-priority rule that matches the given destination address. The HOT takes O(W) time for a lookup and O(W log n) time for an insert or delete. The BOT structure takes O(W log n) time for a lookup and O(W) time for an insert/delete. However it would be desirable to reduce these times as much as possible to efficiently route packets.

Hardware solutions that involve the use of content addressable memory as well as solutions that involve modifications to the Internet Protocol (i.e., the addition of information to each packet) have also been proposed to increase the efficiency of routing packets. Unfortunately, hardware solutions are expensive and are difficult to individualize to specific needs.

In addition to the above mentioned papers, a number of U.S. Patents and published applications address dynamic routing schemes including, but not limited to U.S. Pat. Nos. 6,341,130; 6,335,932; 6,289,013; 6,212,184; 6,157,955; 6,092,072; 6,061,712; 6,041,053; 6,021,131; 6,018,524; 5,909,440; 5,787,430; 5,701,467; 5,555,405; 4,833,468; 4,251,861; and published patent application number 2002/ 0009076. Unfortunately, these references do not disclose schemes that adequately reduce the time in routing packets.

Accordingly, there is a need in the art for a routing structure to provide more effective ways to classify and route data packets. Specifically, a prefix partitioning scheme is needed to provide rapid and more memory efficient methods to search, insert and delete items when used in conjunction with known dynamic router data tables.

SUMMARY OF THE INVENTION

The present invention provides unique schemes that are simple and permit faster prefix routing for dynamic router tables. As contemplated by the present invention, a dynamic routing table is constructed in which prefixes are partitioned at each node into up to $min(n, 2^s+1)$ partitions based on their first s bits, wherein $s \leq W$. W is commonly used to denote the maximum possible length of a prefix. Prefixes whose length is less than s are placed into partition −1, with the remaining prefixes stored into the partitions that correspond to their first s bits.

According to the present invention, two forms of prefix partitioning are available: one-level dynamic partitioning (OLDP) and two-level dynamic partitioning (TLDP). By avoiding prefix expansion, the present invention is better suited for dynamic router tables.

According to the present invention, any known static and/or dynamic routing schemes can be applied to the partitions formed using the prefix partitioning schemes of the invention. In certain embodiments, data structures for binary tree on binary tree (BOB), prefix binary tree on binary tree (PBOB), and longest matching prefix binary tree on binary tree (LMPBOB) data structures are applied to partitions formed by the prefix partitioning scheme of the invention. Other routing schemes that can be applied to partitions of the present invention include, but are not limited to, a B-tree data structure; CRBT and ACRBT data structures; a priority search trees (PST) data structure; HOT and BOT data structures; a collection of red-black trees with each search tree being a splay tree (CST); a multibit trie (MULTIBIT); a one bit TRIE; and an array linear list in which the prefixes are stored in a one-dimensional array in non-decreasing order of prefix length (ARRAY).

In one embodiment, a dynamic nonintersecting highest-priority range-table (NHPRT) using binary tree on binary tree (BOB) data structures is applied to a partition of the prefix partitioning scheme of the present invention.

In another embodiment, a dynamic highest-priority prefix-table (HPPT) that uses prefix binary tree on binary tree (PBOB) data structures is applied to a partition of the prefix partitioning scheme of the present invention.

In yet another embodiment of the invention, a dynamic longest-matching prefix-table (LMPT) that uses longest matching prefix binary tree on binary tree (LMPBOB) data structures is applied to a partition created using the prefix partitioning scheme of the present invention.

In still another embodiment of the invention, fixed stride tries (FST) suitable for dynamic tables are applied to partitions created using the prefix partitioning scheme of the present invention. An FST is a trie in which all nodes that are at the same level have the same stride.

The advantages of the invention are numerous. One significant advantage of the invention is that it provides a more memory efficient data structure, allowing better system resource allocation and allowing faster search and update.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

FIG. 21 is a table tabulating the prefix times for a BOB, PBOB, and a LMPBOB as compared to a PST data structure.

Figure 1:
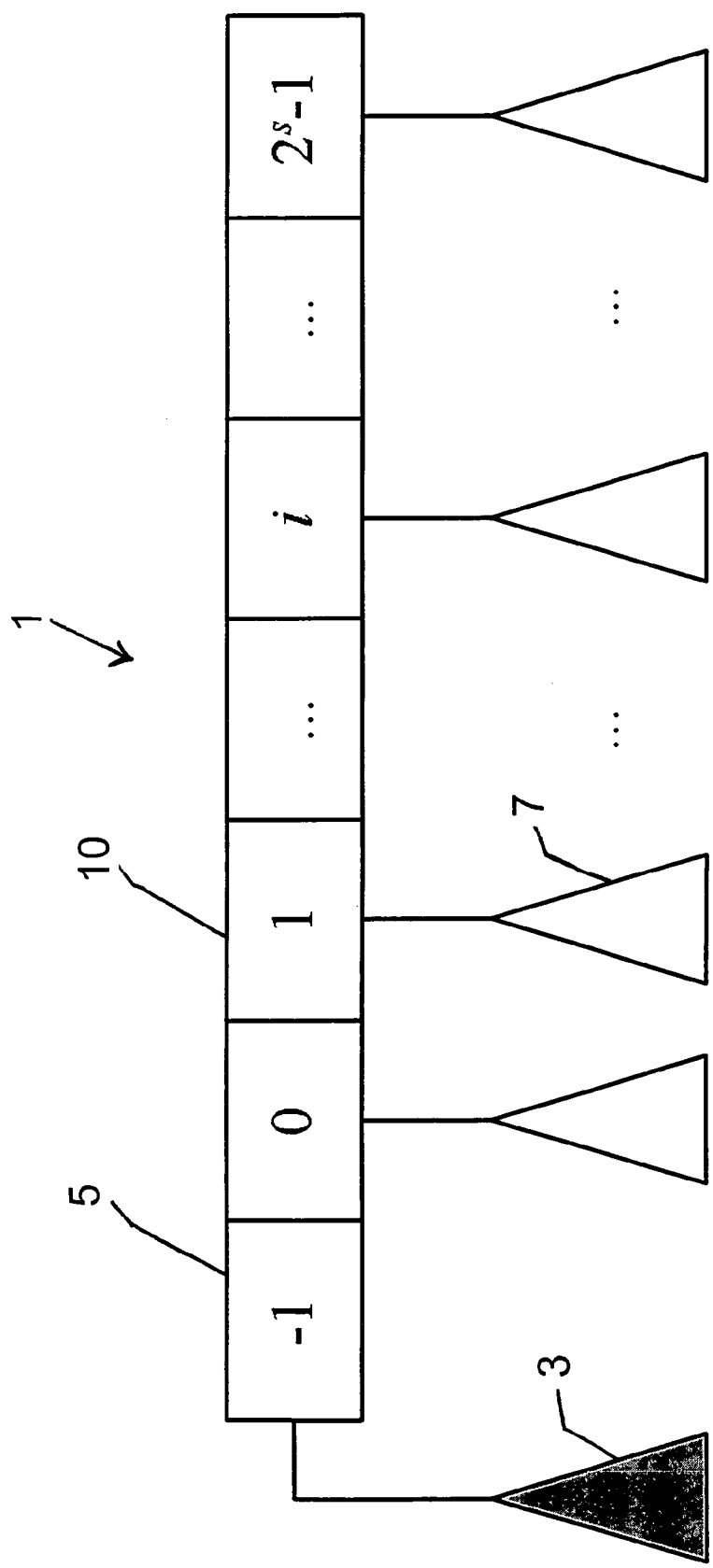
FIG. 1 is a pictorial representation of a one-level dynamic prefix partitioning scheme of the present invention.
Figure 2B:
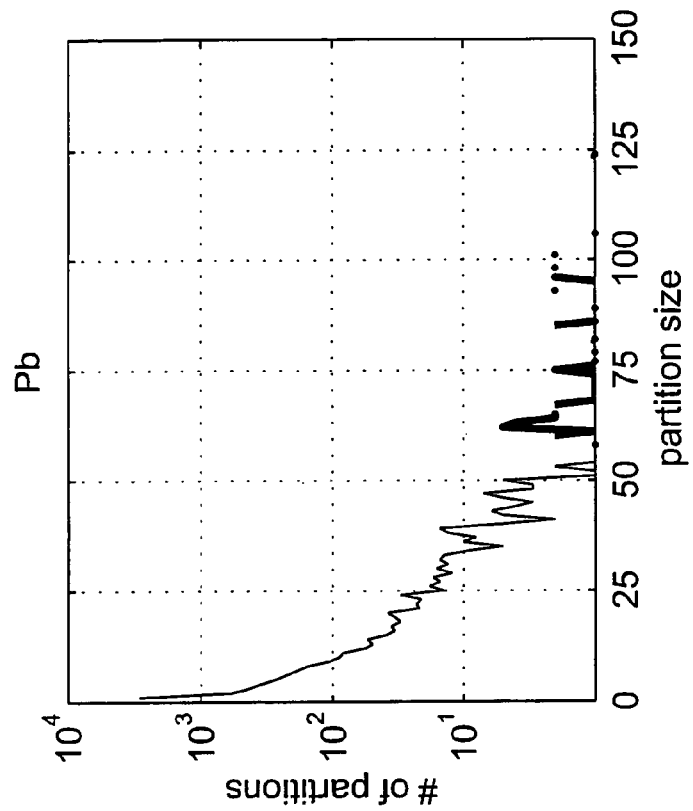
FIGS. 2A, 2B, 2C, and 2D are histograms of partition sizes (excluding partition −1) for router tables in which OLDP is applied in accordance with the present invention.
Figure 2A:
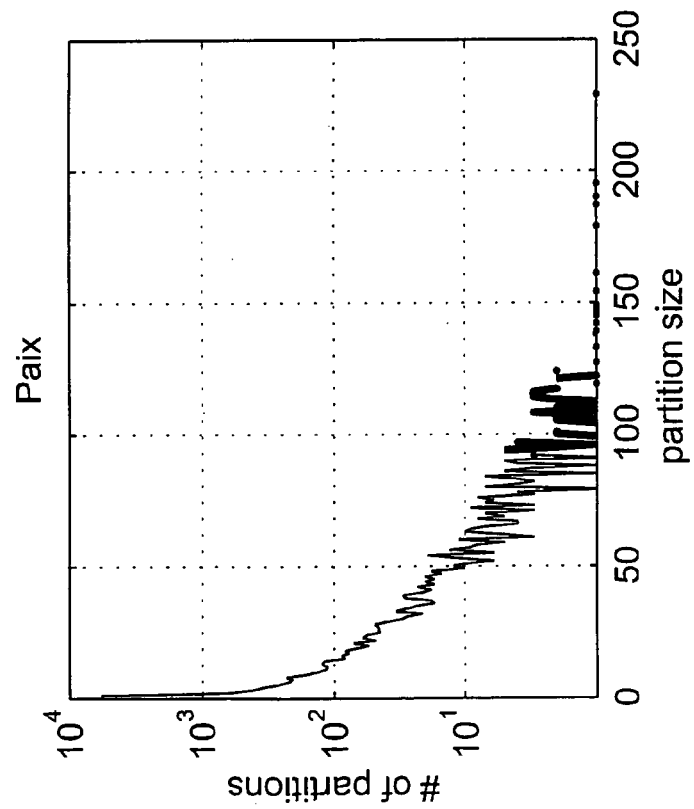
Figure 2C:
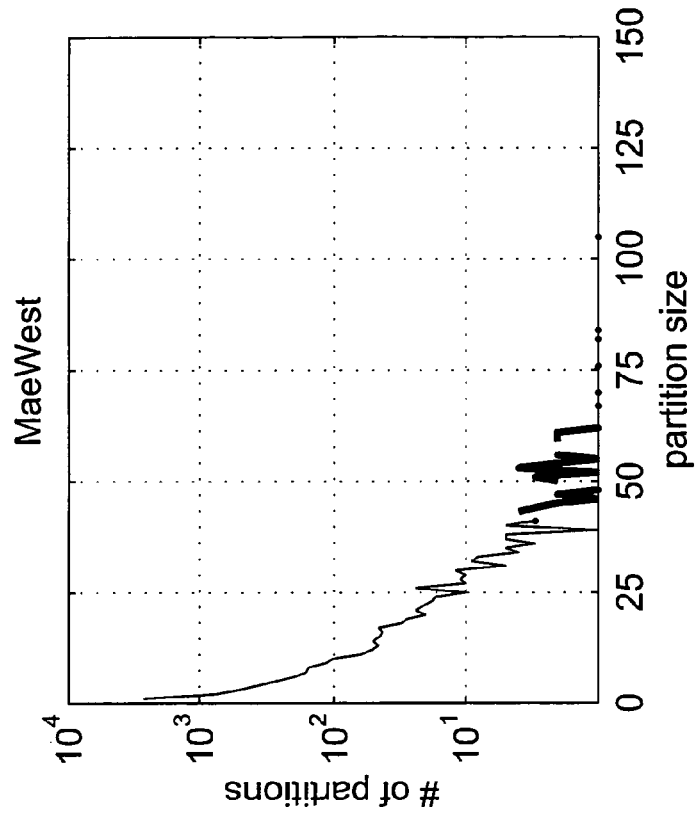
Figure 2D:
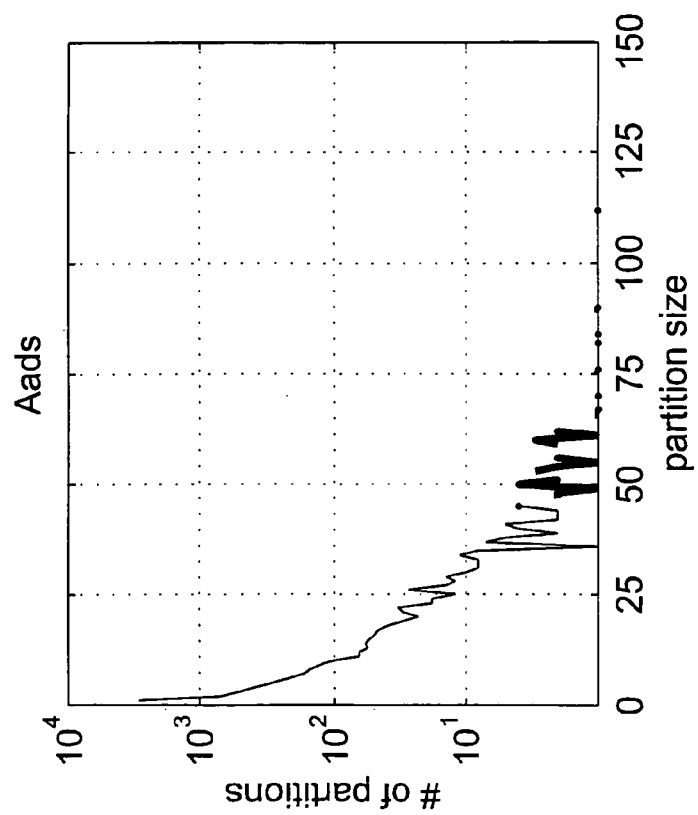

It should be understood that in certain situations for reasons of computational efficiency or ease of maintenance, the ordering and relationships of the blocks of the illustrated flow charts could be rearranged or re-associated by one skilled in the art.

DETAILED DESCRIPTION OF THE INVENTION

The present invention relates to methods for improving router operations and improving the amount of memory storage required for current router table structures. In one embodiment of the present invention, the dynamic router table is organized such that prefixes are partitioned into up to min(n, $2^s+1$) partitions, using pre-established s bits of prefixes, wherein $s \leq W$. Prefixes whose length is less than s are placed into a designated partition (i.e., partition −1). The remaining prefixes, whose length is greater than or equal to s, are stored in partitions that correspond to the value of their first s bits.

In an embodiment, a binary tree on binary tree (BOB) data structure for the representation of dynamic NHPRTs is applied to a partition created using the prefix partition scheme of the invention. In a preferred embodiment, a top level, single balanced binary search tree in combination with lower level-range search trees is implemented in an NHRT-type routing data structure of a partition.

According to the present invention, HPPTs represented by PBOB are applied to partitions of a data structure created using the prefix partitioning scheme of the present invention. In a preferred embodiment, a top level, single-balanced binary search tree in combination with an array linear list is implemented for the HPPT.

In addition, LMPTs represented by LMPBOB are applied to partitions of a data structure that is created using the prefix partitioning scheme of the present invention. In a preferred embodiment, a top level, single-balanced binary search tree in combination with a W-bit vector is implemented for an LMPT.

Definition of Terms

As used herein, the term "node" refers to an entry into a tree structure.

As used herein, the term "child" or "children" refers to the subsequent node(s) any given node points to. The term "parent" refers to the node that points to any given node or child. The term "sibling," as used herein, refers to nodes or children having the same parent.

The term "root," as used herein, refers to the top node of a tree structure and the term "leaf," refers to a node with no children.

The term "trie," as used herein, refers to a tree structure organized for searching data.

Prefix Partitioning

The present invention relates to multi-level partitioning, in which a dynamic router table structure is organized such that prefixes are partitioned by the first s bits of the prefixes, where $s \leq W$. The partitioned tree comprises $2^s+1$ partitions. Prefixes that have a length less than s bits fall into a designated partition (i.e., partition −1); the remaining prefixes are stored in partition that corresponds to the value of their first s bits. By storing shorter length prefixes in a designated partition, the prefix partitioning scheme of the present invention is suitable for dynamic routing operations.

In one embodiment of the present invention, a one-level dynamic partition (OLDP) structure 1 is provided in which the root node represents the partitioning of the router-table into $2^s+1$ partitions. As illustrated in FIG. 1, s bits are established so that incoming packets, which specify prefixes and decisions rules for the prefixes, can be partitioned. Prefixes are assessed to determine whether the prefix has a length greater than or equal to s bits. Prefixes having a length that is less than s 3 fall into a designated partition 5 (i.e., partition −1). Prefixes having a length greater than or an equal to s are placed into a partition that corresponds to the value of their first s bits 10. In a preferred embodiment, nonempty partitions are indexed by an array or a hash table.

For example, where s is established as 3, a prefix whose length is 7 (i.e., the prefix is 0111101*) will be placed in a partition that corresponds to the value of the prefix's s bits. In this particular example, since s=3, the prefix's first s bit is 011. Where a linear binary string valuation system is used, the value of the prefix's first s bit (011) is 3. Thus, the prefix would be placed into partition that corresponds to the value 3. The prefixes in each partition are then represented using dynamic router table data structures 7.

Compatible dynamic router table data structures include router table data structures that have been disclosed in Lampson et al., "IP lookup using multiway and multicolumn search," *IEEE INFOCOM*, 1998; Ergun et al., "A dynamic lookup scheme for bursty access patterns," *IEEE INFOCOM*, 2001; in U.S. Pat. Nos. 6,266,706; 6,563,823; 6,522,632; and 5,761,440.

The OLDP of the invention was applied to four different types of known router tables —Paix, Pb, Aads, MaeWest— with s=16. As can be seen in the following Table 1 and in FIGS. 2A, 2B, 2C, and 2D, OLDP with s=16 is quite effective in reducing both the maximum and the average partition size. In all of the representative databases, partition −1 was substantially larger than the remaining partitions.

TABLE 1

Statistics of one level partition (s = 16)

| Database | Paix | Pb | Aads | MaeWest |
|---|---|---|---|---|
| # of prefixes | 85988 | 35303 | 31828 | 28890 |
| # of nonempty partitions | 10443 | 6111 | 6363 | 6026 |
| Partition − 1 | 586 | 187 | 188 | 268 |
| Max size of remaining partitions | 229 | 124 | 112 | 105 |
| Average size of nonempty partitions (excluding partition − 1) | 8.2 | 5.7 | 5.0 | 4.8 |

Figure 3:
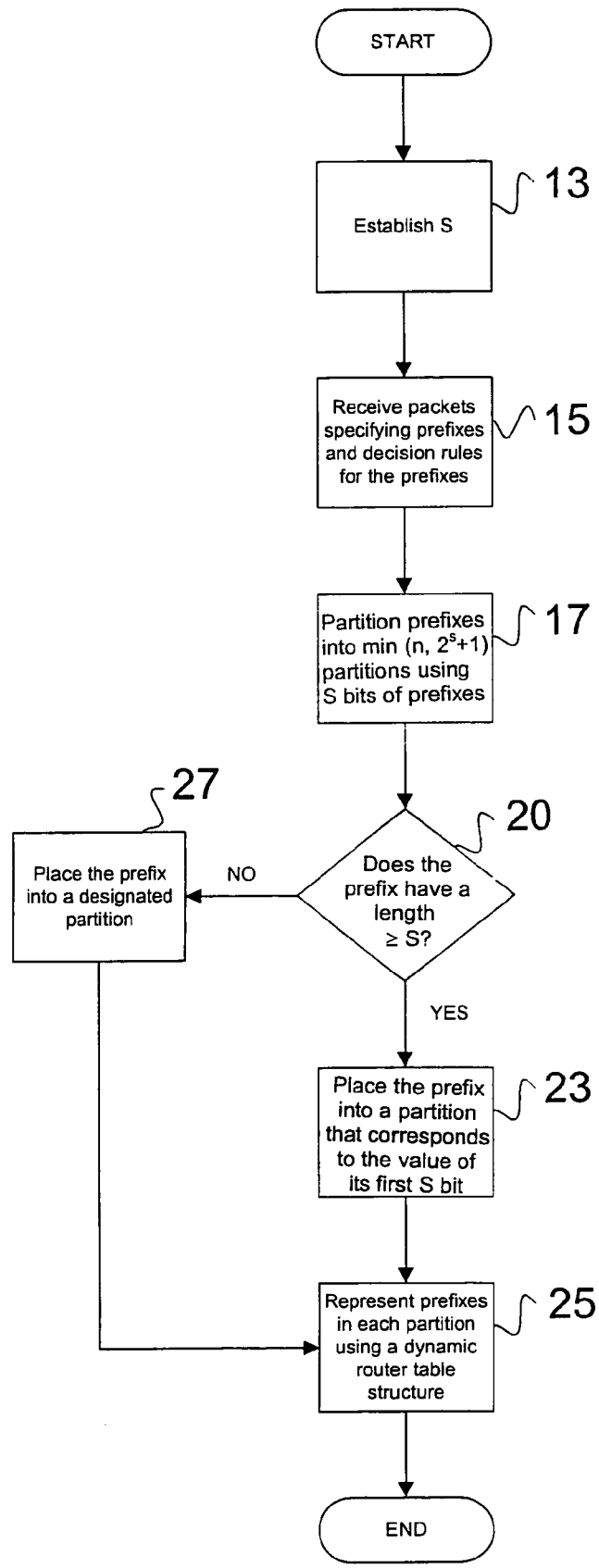
FIG. 3 is a flow chart illustrating the steps of using the prefix partitioning scheme of FIG. 1.

In a preferred embodiment, a dynamic router table is constructed in which OLDP is implemented to partition the prefixes in the table. The partitions can be represented using any known dynamic routing table data structure (i.e., hash tables). For example, as illustrated in FIG. 3, a dynamic router table using the prefix partitioning scheme of the present invention comprises the steps of: choosing the s bits with which the prefixes will be partitioned 13; receiving packets specifying the prefixes and decision rules for the prefixes 15; partitioning the prefixes into up to min(n, $2^s+1$) partitions based on the first s bits of the prefixes 17; assessing whether a prefix has a length equal to or greater than s 20; should the prefix have a length greater than or equal to s, the prefix is placed in a partition based on the value of the prefix's first s bit 23; and representing the prefixes in each partition using a dynamic router structure 25; or, where the assessment identifies a prefix with a length is less than s 27, the prefix is placed into a designated partition (i.e., partition −1).

Figure 4:
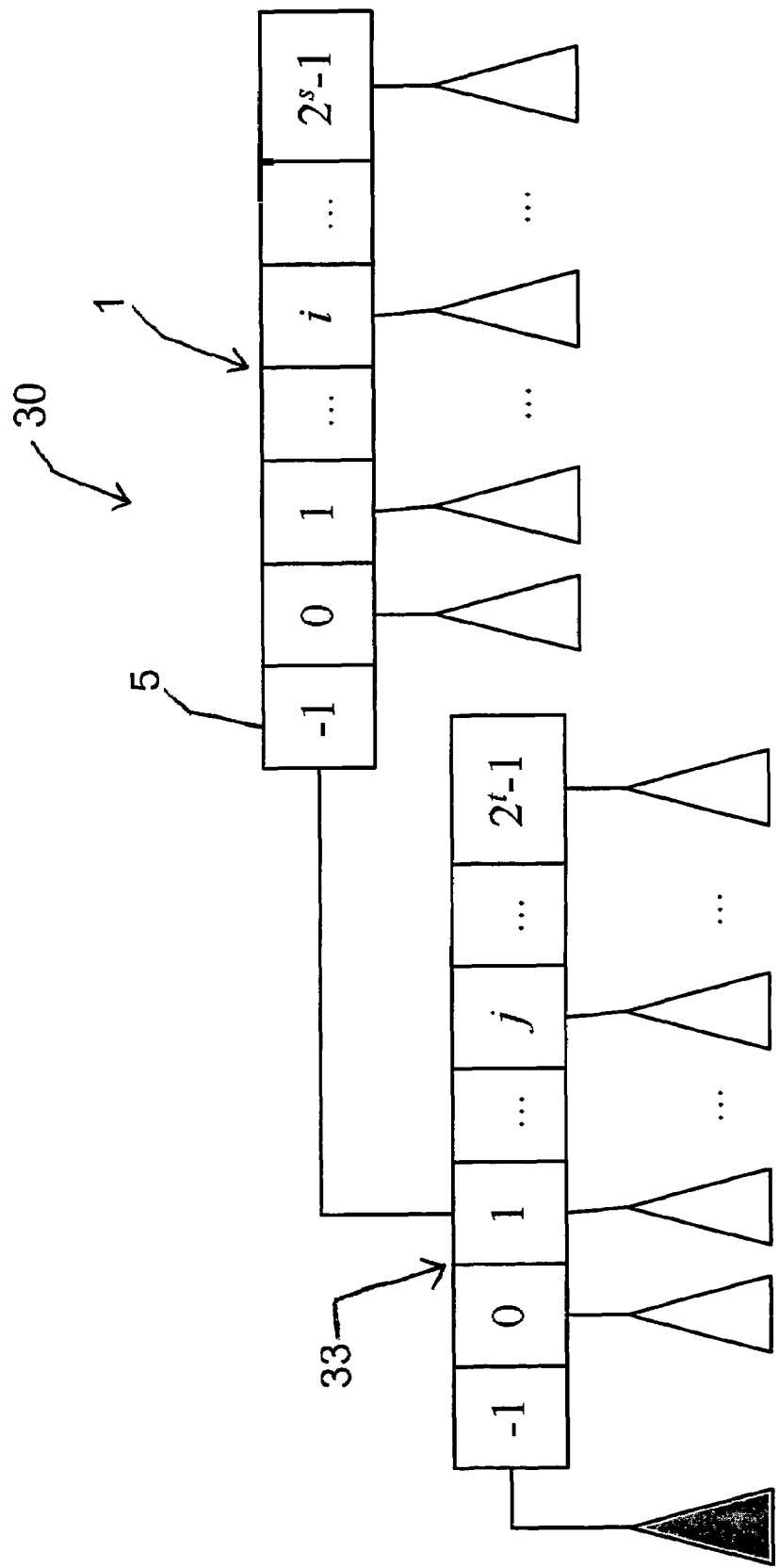
FIG. 4 is a pictorial representation of a two-level dynamic prefix partitioning scheme of the present invention.

In FIG. 4, a two level dynamic partition (TLDP) structure 30 is constructed in which the root node partitions the prefix set into partitions of OLDP 1 by using the first s bits of each prefix. Additionally, the set of prefixes in the designated partition 5 for prefixes whose length is less than s (i.e., partition −1) is further partitioned at the TLDP node 33 by using pre-established t bits, wherein t<s bits of the prefixes in the designated partition 5 (partition −1). This partitioning follows the strategy used at the root. However, t rather than s bits are used. The prefixes of the partitions can be represented using known routing table data structures (i.e., B-tree data structure, HOT and BOT data structures, CRBT and ACRBT data structures, PST data structure, CST, MUTIBIT, TRIE, and ARRAY).

Figure 5:
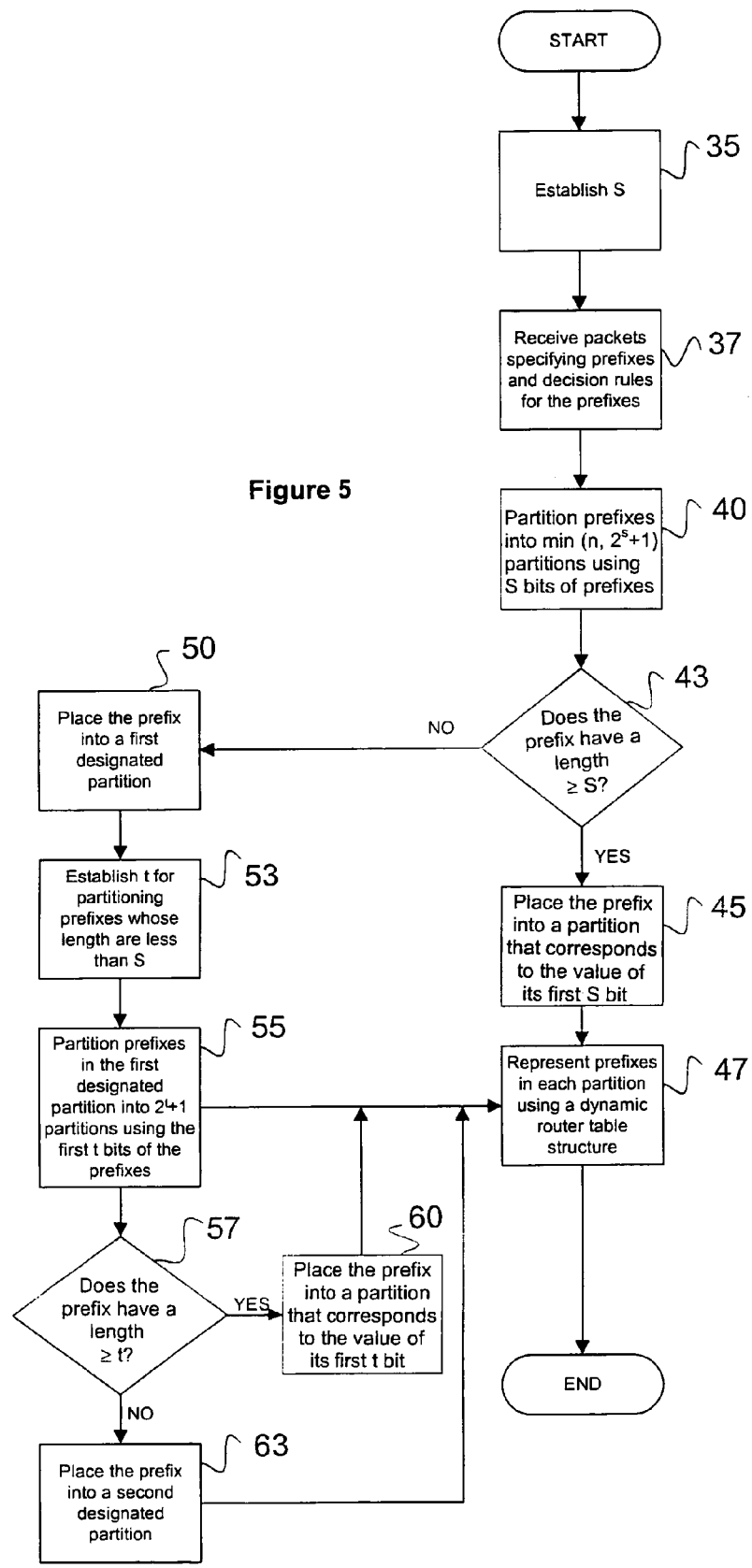
FIG. 5 is a flow chart illustrating the steps of using the prefix partitioning scheme of FIG. 4.

As illustrated in FIG. 5, a TLDP structure is constructed in a fashion very similar to that of OLDP. As with the OLDP, s bits by which prefixes are partitioned are first established 35 and packets specifying the prefixes and decision rules for the prefixes are received 37. The prefixes are then partitioned into min(n, $2^s+1$) partitions using the first s bits of each prefix 40. Prefixes having a length equal to or greater than s are identified 43 and placed into a partition that corresponds to the value of the prefix's first s bit 45. The prefixes in each partition are represented using a dynamic routing table structure 47. Where the prefixes have a length less than s, they are placed into a designated partition, partition −1 50.

Then, t bits are established by which the prefixes in partition −1 are further partitioned 53. Therefore, the prefixes of partition −1, are partitioned into $2^t+1$ partitions using the first t bits of the prefixes 55. For prefixes in partition −1 having a length equal to or greater than t bits 57, they are placed into partitions corresponding to the value of the prefix's first t bit 60 and represented using a dynamic routing table structure 47. Prefixes having lengths less than t bits are placed into a second designated partition 63 and represented using a dynamic routing structure 47.

The TLDP of the invention was applied to four different types of known router tables —Paix, Pb, Aads, MaeWest— with s=16 and t=8. When the number of prefixes in each partition is rather small, each partition can be represented using an array linear list in which the prefixes are in decreasing order of length. As can be seen in the following Table 2, TLDP with s=16 and t=8 is quite effective in reducing both the maximum and the average partition size.

TABLE 2

Statistics of two level partitions (s = 16 and t = 8)

| Database | Paix | Pb | Aads | MaeWest |
|---|---|---|---|---|
| OLDP Partition − 1 | 586 | 187 | 188 | 268 |
| # of nonempty TLDP partition | 91 | 57 | 53 | 67 |
| TLDP Partition − 1 | 0 | 0 | 0 | 0 |
| Max {TLDP partitions} | 33 | 12 | 15 | 15 |
| Average number of nonempty TLDP partitions | 6.4 | 3.3 | 3.5 | 4.0 |

Using the prefix partitioning scheme of the present invention, the prefixes in each partition in the router table can be represented using a dynamic router table structure known to the skilled artisan. By doing so, the processing time required to search, insert, and delete tuples in each partition is reduced.

In one embodiment, at least one partition is constructed using a priority search tree (PST) and red black priority search tree (RBPST). With this partition, the functions of search, insert, and delete of tuples are processed expeditiously. It is well known that if R is a set of ranges such that each range represents an address prefix, no two ranges will intersect. As a result, the set of ranges R, is conflict free. To find the most specific range in the partition, the ranges are mapped in 2-dimensional space and the map is transformed so that no two points of the transformed map have the same x-value. Then, the transformed range map is represented as PST. By operating on the PST to define a rectangle comprising the ranges associated with the desired destination address, the most specific range can then be found by locating the point in the defined rectangle having the least x-value. Using this method, the longest prefix is located in the dynamic router table. To insert a prefix into the router data table, the range is mapped and transformed as described above, and the transformed range is inserted into the PST. To delete a prefix, the transformed range is removed from the PST. When the PST is an RBPST, each search, insert, and delete action is performed in $O(\log n)$ time.

Experimental Results

To assess the efficacy of the prefix partitioning schemes of the present invention, these schemes were programmed in C++ and applied as the OLDP[i], $i \geq 0$ structure (as well as the OLDP[−1] structure in the case of one-level dynamic partitioning) to the following dynamic router-table structures: ACRBT (ACBST with each search tree being a red-black tree), CST (ACBST with each search tree being a splay tree), MULTIBIT (16-4-4-4-4 FST; in OLDP applications, 4-4-4-4-FSTs are used for OLDP[i], $i \geq 0$ and a 4-4-4-3-FST is used for OLDP[−1]; in TLDP applications, 4-4-4-4-FSTs are used for OLDP[i], i 24, 4-3-FSTs for TLDP[i], $i \geq 0$, and a 4-3-FST for TLDP[−1]), MULTIBITb (16-8-8 FST; in OLDP applications, 8-8-FSTs are used for OLDP[i], $i \geq 0$, and an 8-7-FST is used for OLDP[−1]; in TLDP applications, 8-8 FSTs are used for OLDP[i], $I \geq 0$ 8-FSTs for TLPD[i], $i \geq 0$, and a 7-FST is used for TLDP[−1]), PST (prefix search trees), PBOB (prefix binary tree on binary tree structure), TRIE (one bit trie) and ARRAY (this is an array linear list in which the prefixes are stored in a one-dimensional array in non-decreasing order of prefix length; the longest matching-prefix is determined by examining the prefixes in the order in which they are stored in the one-dimensional array; array doubling is used to increase array size, as necessary, during an insertion). The notation ACRBT1p (ACRBT1 pure), was used to refer to OLDP with ACRBTs. ACRBT2p refers to TLDP with ACRBTs.

The schemes whose name end with an "a" (for example, ACRBT2a) are variants of the corresponding pure schemes. In ACRBT2a, for example, each of the TLDP codes, TLDP[i] was implemented as an array linear list until |TLDP[i]|>τ, where the threshold τ was set to 8. When |TLDP[i]|>τ for the first time, TLDP[i] was transformed from an array linear list to the target dynamic router-table structure (i.e., PBOB in the case of PBOB2). Once a TLDP[i] was transformed into the target dynamic router-table structure, it was never transformed back to the array linear list structure no matter how small |TLDP[i]| became. Similarly, OLDP[i], $i \geq 0$ for TLDPs were implemented as array linear lists until |OLDP[i]|>τ for the first time. A similar use of array linear lists was made when implementing the OLDP codes.

When τ=0, the corresponding pure scheme (i.e., when τ=0, ACRBT1a is equivalent to ACRBT1p and PBOB2a is equivalent to PBOB2p, for example) is obtained and when τ=∞, one of the two partitioned ARRAY schemes (i.e., ACRBT1a, CST1a, PST1a, PBOB1a, etc. are equivalent to ARRAY1p while ACRBT2a, CST2a, MULTIBIT2a, etc. are equivalent to ARRAY2p) is obtained. By varying the threshold τ between the two extremes 0 and ∞ the performance of hybrid schemes such as ACRBT1a, MULTIBIT2a, etc. can be varied between that of the pure partitioned scheme and that of ARRAY1p and ARRAY2p.

ACRBT2aH refers to ACRBT2a in which the root-level partitioning node is represented using a hash table rather than an array. For the OLDP partitioning schemes, s=16 and τ=∞. Note that the combinations ARRAY1a and ARRAY2a are the same as ARRAY1p and ARRAY2p.

The codes for the partitioning schemes were run on a 2.26 GHz Pentium 4 PC that has 500 MB of memory. The Microsoft Visual C++ 6.0 compiler with optimization level-O2 was used. For test data, the four IPv4 prefix databases of Table 1 were used.

Total Memory Requirement

Figure 6:
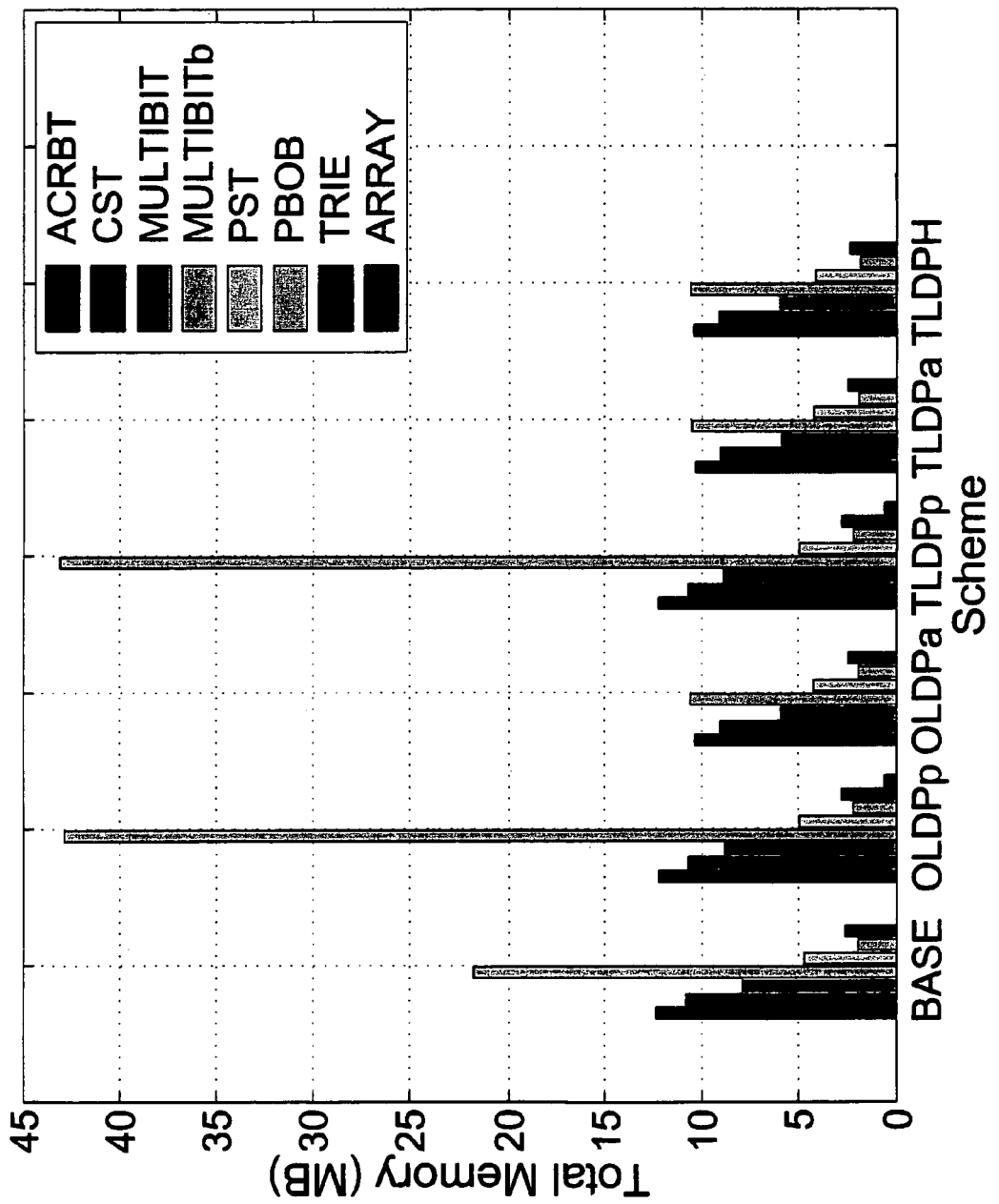
FIG. 6 is a graph illustrating the total memory required by each of the router-table data structures.

The following Tables 3 and 4 and FIG. 6 show the amount of memory used by each of the tested structures. In the figure, OLDPp refers to the pure one-level dynamic prefix partitioning versions of the base schemes, in accordance with the present invention. The amount of memory required by a base data structure (such as ACRBT) is generally less than that required by its OLDP version (ACRBT1p and ACRBT1a). ACRBT1a, ACRBT1p, CST1p, ACRBT1P, and CST1P with Paix are some of the exceptions. In the case of MaeWest, for example, the memory required by PBOB1p is about 39% more than that required by PBOB. The TLDP structures (both with an array for the OLDP node and with a hash table for this node) took considerably less memory than did the corresponding base structure. For example, MULTIBIT2a with MaeWest required only 45% of the memory taken by MULTIBIT and MULTIBITb2a with MaeWest took 23% of the memory taken by MULTIBITb. Thus, the prefix partitioning schemes of the invention not only reduce run time, but the TLDPa schemes also reduce memory requirement. Of the tested structures, ARRAY1p and ARRAY2p are the most memory efficient. The worst-case time to search, insert, and delete in these structures is O(n) (although in practice, the times are better because the prefixes in the test databases distribute quite well and the size of each OLDP[i] and TLDP[i] is quite small). PBOB is the most memory efficient in the worst-case time to search, insert, and delete. On the Paix database, for example, PBOB1a takes only 19% of the memory taken by ACRBT1a and only 79% of the memory taken by TRIE1a; PBOB takes 16% of the memory taken by ACRBT and 75% of the memory taken by TRIE.

TABLE 3

Memory requirement (in KB)

| Scheme | Paix | Pb | Aads | MaeWest |
|---|---|---|---|---|
| ACRBT | 12360 | 5102 | 4587 | 4150 |
| CST | 10800 | 4457 | 4008 | 3636 |
| MULTIBIT | 7830 | 4939 | 4982 | 4685 |
| MULTIBITb | 21778 | 16729 | 19177 | 17953 |
| PST | 4702 | 1930 | 1740 | 1579 |
| PBOB | 1961 | 811 | 729 | 661 |
| TRIE | 2622 | 1091 | 980 | 890 |
| ACRBT1p | 12211 | 5479 | 5023 | 4638 |
| CST1p | 10708 | 4846 | 4451 | 4115 |

TABLE 3-continued

Memory requirement (in KB)

| Scheme | Paix | Pb | Aads | MaeWest |
|---|---|---|---|---|
| MULTIBIT1p | 8848 | 5087 | 5098 | 4731 |
| MULTIBITb1p | 42845 | 25368 | 27278 | 24920 |
| PST1p | 4958 | 2186 | 1996 | 1835 |
| PBOB1p | 2219 | 1067 | 985 | 917 |
| TRIE1p | 2799 | 1279 | 1163 | 1075 |
| ARRAY1p | 632 | 417 | 405 | 392 |
| ACRBT1a | 10361 | 3736 | 3151 | 2787 |
| CST1a | 9079 | 3306 | 2799 | 2481 |
| MULTIBIT1a | 5884 | 2644 | 2439 | 2119 |
| MULTIBITb1a | 10605 | 4862 | 5588 | 4183 |
| PST1a | 4209 | 1603 | 1377 | 1237 |
| PBOB1a | 1928 | 851 | 757 | 697 |
| TRIE1a | 2457 | 1021 | 893 | 815 |
| ACRBT2p | 12212 | 5482 | 5027 | 4641 |
| CST2p | 10711 | 4849 | 4455 | 4119 |
| MULTIBIT2p | 8891 | 5104 | 5113 | 4752 |
| MULTIBITb2p | 43068 | 25503 | 27391 | 25065 |
| PST2p | 4959 | 2187 | 1997 | 1836 |
| PBOB2p | 2220 | 1068 | 986 | 918 |
| TRIE2p | 2799 | 1279 | 1163 | 1075 |
| ARRAY2p | 634 | 418 | 406 | 393 |
| ACRBT2a | 10337 | 3720 | 3137 | 2767 |
| CST2a | 9060 | 3292 | 2786 | 2463 |
| MULTIBIT2a | 5858 | 2621 | 2414 | 2088 |
| MULTIBITb2a | 10514 | 4778 | 5498 | 4075 |
| PST2a | 4201 | 1597 | 1372 | 1229 |
| PBOB2a | 1926 | 850 | 755 | 695 |
| TRIE2a | 2452 | 1018 | 890 | 811 |

TABLE 4

Memory Requirement (in KB) (hash schemes)

| Scheme | Paix | Pb | Aads | MaeWest |
|---|---|---|---|---|
| ACRBT2aH | 10407 | 3656 | 3080 | 2699 |
| CST2aH | 9130 | 3228 | 2730 | 2397 |
| MULTIBIT2aH | 5928 | 2557 | 2359 | 2022 |
| MULTIBITb2aH | 10584 | 4714 | 5443 | 4009 |
| PST2aH | 4101 | 1498 | 1272 | 1129 |
| PBOB2aH | 1826 | 750 | 656 | 595 |
| TRIE2aH | 2353 | 919 | 790 | 711 |

Search Time

To measure the average search time, a data structure for each of the prefix databases was constructed. Four sets of test data were used. The destination addresses in the first set, NONTRACE, comprised the end points of the prefixes corresponding to the database being searched. These end points were randomly permuted. The data set, PSEUDOTRACE, was constructed from NONTRACE by selecting 1000 destination addresses. A PSEUDOTRACE sequence comprises 1,000,000 search requests. For each search, a destination from the selected 1000 destination addresses was randomly chosen. The data set PSEUDOTRACE100 is similar to PSEUDOTRACE except that only 100 destination addresses were chosen to make up the 1,000,000 search requests. The last data set, PSEUDOTRACE100L16 differs from PSEUDOTRACE 100 only in that the 100 destination addresses were chosen so that the length of the longest matching prefix for each is less than 16. So, every search in PSEUDOTRACE100L16 differs from PSEUDOTRACE100 only in that the 100 destination addresses were chosen so that the length of the longest matching prefix for each is less than 16. Therefore, every search in PSEUDOTRACE100L16 required a search in OLDP[-1]. The NONTRACE, PSEUDOTRACE, and PSEUDOTRACE100 data sets represent different degrees of burstiness in the search pattern. In NONTRACE, all search addresses are different. This access pattern represents the lowest possible degree of burstiness. In PSEUDOTRACE, since destination addresses that repeat are not necessarily in consecutive packets, there is some measure of temporal spread among the recurring addresses. Thus, PSEUDOTRACE100 has greater burstiness than does PSEUDOTRACE.

For the NONTRACE, PSEUDOTRACE, PSEUDOTRACE100, and PSEUDOTRACE100L16 data sets, the total search time for each data set was measured and then averaged to get the time for a single search. This experiment was repeated 10 times and 10 average times were obtained. The average of these averages is given in Tables 5 through 10. For the PSEUDOTRACE100 and PSEUDOTRACE100L16 data sets, the times are presented only for the base and pure one-level and two-level partitioning schemes. FIGS. 7A through 7D are histograms of the average time for PAIX.

TABLE 5

Avereage search time (in μsec) for NONTRACE

| Scheme | Paix | Pb | Aads | MaeWest |
|---|---|---|---|---|
| ACRBT | 1.31 | 0.98 | 0.94 | 0.92 |
| CST | 2.18 | 1.65 | 1.57 | 1.54 |
| MULTIBIT | 0.50 | 0.42 | 0.42 | 0.41 |
| MULTIBITb | 0.28 | 0.24 | 0.26 | 0.25 |
| PST | 1.09 | 0.80 | 0.75 | 0.70 |
| PBOB | 0.82 | 0.48 | 0.45 | 0.38 |
| TRIE | 1.12 | 0.82 | 0.75 | 0.68 |
| ACRBT1p | 1.13 | 0.90 | 0.87 | 0.85 |
| CST1p | 1.83 | 1.42 | 1.35 | 1.31 |
| MULTIBIT1p | 0.61 | 0.50 | 0.51 | 0.51 |
| MULTIBITb1p | 0.41 | 0.35 | 0.39 | 0.38 |
| PST1p | 0.76 | 0.59 | 0.55 | 0.51 |
| PBOB1p | 0.59 | 0.42 | 0.39 | 0.35 |
| TRIE1p | 0.80 | 0.60 | 0.56 | 0.51 |
| ARRAY1p | 0.19 | 0.10 | 0.10 | 0.09 |
| ACRBT1a | 0.97 | 0.66 | 0.60 | 0.57 |
| CST1a | 1.63 | 1.04 | 0.91 | 0.85 |
| MULTIBIT1a | 0.54 | 0.36 | 0.34 | 0.32 |
| MULTIBITb1a | 0.32 | 0.20 | 0.22 | 0.20 |
| PST1a | 0.70 | 0.45 | 0.39 | 0.34 |
| PBOB1a | 0.52 | 0.30 | 0.25 | 0.20 |
| TRIE1a | 0.69 | 0.41 | 0.36 | 0.31 |
| ACRBT2p | 1.13 | 0.89 | 0.87 | 0.86 |
| CST2p | 1.82 | 1.41 | 1.33 | 1.30 |
| MULTIBIT2p | 0.61 | 0.50 | 0.52 | 0.51 |
| MULTIBITb2p | 0.41 | 0.35 | 0.38 | 0.37 |
| PST2p | 0.76 | 0.59 | 0.55 | 0.50 |
| PBOB2p | 0.58 | 0.41 | 0.39 | 0.34 |
| TRIE2p | 0.79 | 0.60 | 0.56 | 0.50 |
| ARRAY2p | 0.19 | 0.11 | 0.10 | 0.09 |
| ACRBT2a | 0.97 | 0.66 | 0.60 | 0.57 |
| CST2a | 1.63 | 1.04 | 0.90 | 0.85 |
| MULTIBIT2a | 0.50 | 0.33 | 0.32 | 0.30 |
| MULTIBITb2a | 0.32 | 0.21 | 0.22 | 0.20 |
| PST2a | 0.70 | 0.45 | 0.39 | 0.34 |
| PBOB2a | 0.52 | 0.29 | 0.25 | 0.21 |
| TRIE2a | 0.68 | 0.41 | 0.35 | 0.30 |

TABLE 6

Average search time (in μsec) (hash schemes) for NONTRACE

| Scheme | Paix | Pb | Aads | MaeWest |
|---|---|---|---|---|
| ACRBT2aH | 1.10 | 0.75 | 0.69 | 0.65 |
| CST2aH | 1.75 | 1.13 | 0.99 | 0.93 |
| MULTIBIT2aH | 0.63 | 0.43 | 0.42 | 0.39 |
| MULTIBITb2aH | 0.39 | 0.27 | 0.28 | 0.26 |
| PST2aH | 0.83 | 0.57 | 0.48 | 0.41 |

TABLE 6-continued

Average search time (in μsec) (hash schemes) for NONTRACE

| Scheme | Paix | Pb | Aads | MaeWest |
|---|---|---|---|---|
| PBOB2aH | 0.68 | 0.41 | 0.33 | 0.27 |
| TRIE2aH | 0.79 | 0.55 | 0.45 | 0.38 |

TABLE 7

Average search time (in μsec) for PSUEDOTRACE

| Scheme | Paix | Pb | Aads | MaeWest |
|---|---|---|---|---|
| ACRBT | 1.18 | 0.85 | 0.83 | 0.81 |
| CST | 0.46 | 0.42 | 0.42 | 0.41 |
| MULTIBIT | 0.27 | 0.24 | 0.23 | 0.22 |
| MULTIBITb | 0.10 | 0.09 | 0.10 | 0.09 |
| PST | 0.83 | 0.60 | 0.55 | 0.50 |
| PBOB | 0.59 | 0.34 | 0.34 | 0.29 |
| TRIE | 0.85 | 0.63 | 0.56 | 0.50 |
| ACRBT1p | 1.02 | 0.79 | 0.75 | 0.74 |
| CST1p | 0.47 | 0.40 | 0.41 | 0.41 |
| MULTIBIT1p | 0.36 | 0.29 | 0.34 | 0.31 |
| MULTIBITb1p | 0.20 | 0.17 | 0.18 | 0.19 |
| PST1p | 0.46 | 0.33 | 0.28 | 0.28 |
| PBOB1p | 0.29 | 0.19 | 0.17 | 0.17 |
| TRIE1p | 0.48 | 0.34 | 0.33 | 0.30 |
| ARRAY1p | 0.14 | 0.13 | 0.11 | 0.13 |
| ACRBT1a | 0.79 | 0.45 | 0.40 | 0.34 |
| CST1a | 0.34 | 0.24 | 0.21 | 0.19 |
| MULTIBIT1a | 0.29 | 0.18 | 0.17 | 0.16 |
| MULTIBITb1a | 0.15 | 0.12 | 0.12 | 0.11 |
| PST1a | 0.42 | 0.23 | 0.18 | 0.19 |
| PBOB1a | 0.26 | 0.17 | 0.16 | 0.14 |
| TRIE1a | 0.40 | 0.24 | 0.24 | 0.21 |
| ACRBT2p | 1.01 | 0.78 | 0.75 | 0.74 |
| CST2p | 0.47 | 0.40 | 0.42 | 0.42 |
| MULTIBIT2p | 0.37 | 0.31 | 0.33 | 0.32 |
| MULTIBITb2p | 0.21 | 0.18 | 0.19 | 0.19 |
| PST2p | 0.45 | 0.32 | 0.28 | 0.27 |
| PBOB2p | 0.28 | 0.17 | 0.18 | 0.16 |
| TRIE2p | 0.48 | 0.31 | 0.33 | 0.28 |
| ARRAY2p | 0.15 | 0.12 | 0.10 | 0.12 |
| ACRBT2a | 0.79 | 0.47 | 0.40 | 0.37 |
| CST2a | 0.33 | 0.24 | 0.21 | 0.21 |
| MULTIBIT2a | 0.29 | 0.19 | 0.17 | 0.16 |
| MULTIBITb2a | 0.15 | 0.11 | 0.12 | 0.11 |
| PST2a | 0.42 | 0.23 | 0.19 | 0.19 |
| PBOB2a | 0.26 | 0.16 | 0.15 | 0.14 |
| TRIE2a | 0.39 | 0.24 | 0.22 | 0.21 |

TABLE 8

Average search time (in μsec) (hash schemes) for PSUEDOTRACE

| Scheme | Paix | Pb | Aads | MaeWest |
|---|---|---|---|---|
| ACRBT2aH | 0.89 | 0.51 | 0.45 | 0.41 |
| CST2aH | 0.39 | 0.29 | 0.25 | 0.24 |
| MULTIBIT2aH | 0.36 | 0.23 | 0.21 | 0.20 |
| MULTIBITb2aH | 0.18 | 0.14 | 0.15 | 0.14 |
| PST2aH | 0.52 | 0.33 | 0.26 | 0.25 |
| PBOB2aH | 0.38 | 0.23 | 0.20 | 0.19 |
| TRIE2aH | 0.48 | 0.34 | 0.28 | 0.27 |

The measured average search times were considered for only the NONTRACE and PSEUDOTRACE data sets. Use of the OLDP and/or TLDP schemes of the present invention reduces the average search time in all cases other than MULTIBIT1p, MULTIBITb1p, MULTIBIT2p, MULTIBITb2p and MULTIBIT2 aH, and some of the remaining MULTIBIT cases. For Paix, for example, the MULTIBITb1a search time is 14% larger than that for MULTIBIT on the NONTRACE data set and 50% larger on the PSEUDOTRACE data set. The average search for MULTIBIT2a on the MaeWest database is 27% less than that for MULTIBIT when either the NONTRACE or PSEUDOTRACE data set is used.

Slight deterioration in performance when partitioning is applied to MULTIBIT and MULTIBITh is to be expected, because partitioning does not reduce the number of cache misses for any search. For example, the height of MULTIBIT is 4 and that of MULTIBITh is 3. Thus, no search in MULTIBIT results in more than 5 cache misses and in MULTIBITh, no search causes more than 4 cache misses. To search MULTIBIT1p, for example, in the worst case, OLDP[i] is searched (5 cache misses including one to examine the overall root) as well as OLDP[-1] (4 cache misses).

For the Paix database and the NONTRACE data set PBOB1a and PBOB2a both have a search time that is 37% less than that of PBOB. Although the search time for PBOB2aH is 31% larger than that for PBOB2a, the time is 17% less than that for PBOB. This finding is important in that it demonstrates the efficacy of the hashing scheme for situations (such as IPv6 with s=64) in which it is not practical to use an array for the OLDP node.

Further, the average search time is considerably lower for the PSEUDOTRACE data set than for the NONTRACE data set because of the reduction in average number of cache misses per search when the search sequence is bursty. By increasing the burstiness using PSEUDOTRACE100, the average search time was reduced even further (Table 9 and FIG. 7C).

TABLE 9

Search time (in μsec) for PSUEDOTRACE100

| Scheme | Paix | Pb | Aads | MaeWest |
|---|---|---|---|---|
| ACRBT | 0.38 | 0.31 | 0.30 | 0.32 |
| CST | 0.22 | 0.21 | 0.21 | 0.25 |
| MULTIBIT | 0.14 | 0.13 | 0.13 | 0.13 |
| MULTIBITb | 0.07 | 0.07 | 0.07 | 0.07 |
| PST | 0.33 | 0.31 | 0.29 | 0.30 |
| PBOB | 0.33 | 0.27 | 0.27 | 0.26 |
| TRIE | 0.47 | 0.43 | 0.42 | 0.40 |
| ACRBT1p | 0.30 | 0.25 | 0.24 | 0.23 |
| CST1p | 0.17 | 0.16 | 0.16 | 0.16 |
| MULTIBIT1p | 0.16 | 0.14 | 0.15 | 0.14 |
| MULTIBITb1p | 0.12 | 0.11 | 0.11 | 0.11 |
| PST1p | 0.17 | 0.15 | 0.16 | 0.17 |
| PBOB1p | 0.16 | 0.13 | 0.13 | 0.15 |
| TRIE1p | 0.27 | 0.24 | 0.24 | 0.24 |
| ARRAY1p | 0.12 | 0.10 | 0.09 | 0.11 |
| ACRBT2p | 0.30 | 0.26 | 0.26 | 0.25 |
| CST2p | 0.18 | 0.16 | 0.17 | 0.16 |
| MULTIBIT2p | 0.16 | 0.15 | 0.15 | 0.15 |
| MULTIBITb2p | 0.12 | 0.11 | 0.11 | 0.11 |
| PST2p | 0.18 | 0.15 | 0.17 | 0.18 |
| PBOB2p | 0.16 | 0.13 | 0.12 | 0.15 |
| TRIE2p | 0.26 | 0.24 | 0.23 | 0.24 |
| ARRAY2p | 0.12 | 0.11 | 0.10 | 0.09 |

For the NONTRACE data set, ARRAY1p and ARRAY2p had the best search time. For the PSEUDOTRACE and PSEUDOTRACE100 data sets, MULTIBITb was fastest and ARRAY1p and ARRAY2p came in next. Although the base ARRAY structure has an O(n) search time complexity, the use of partitioning enables the (partitioned) ARRAY scheme to be highly competitive.

Figure 7A:
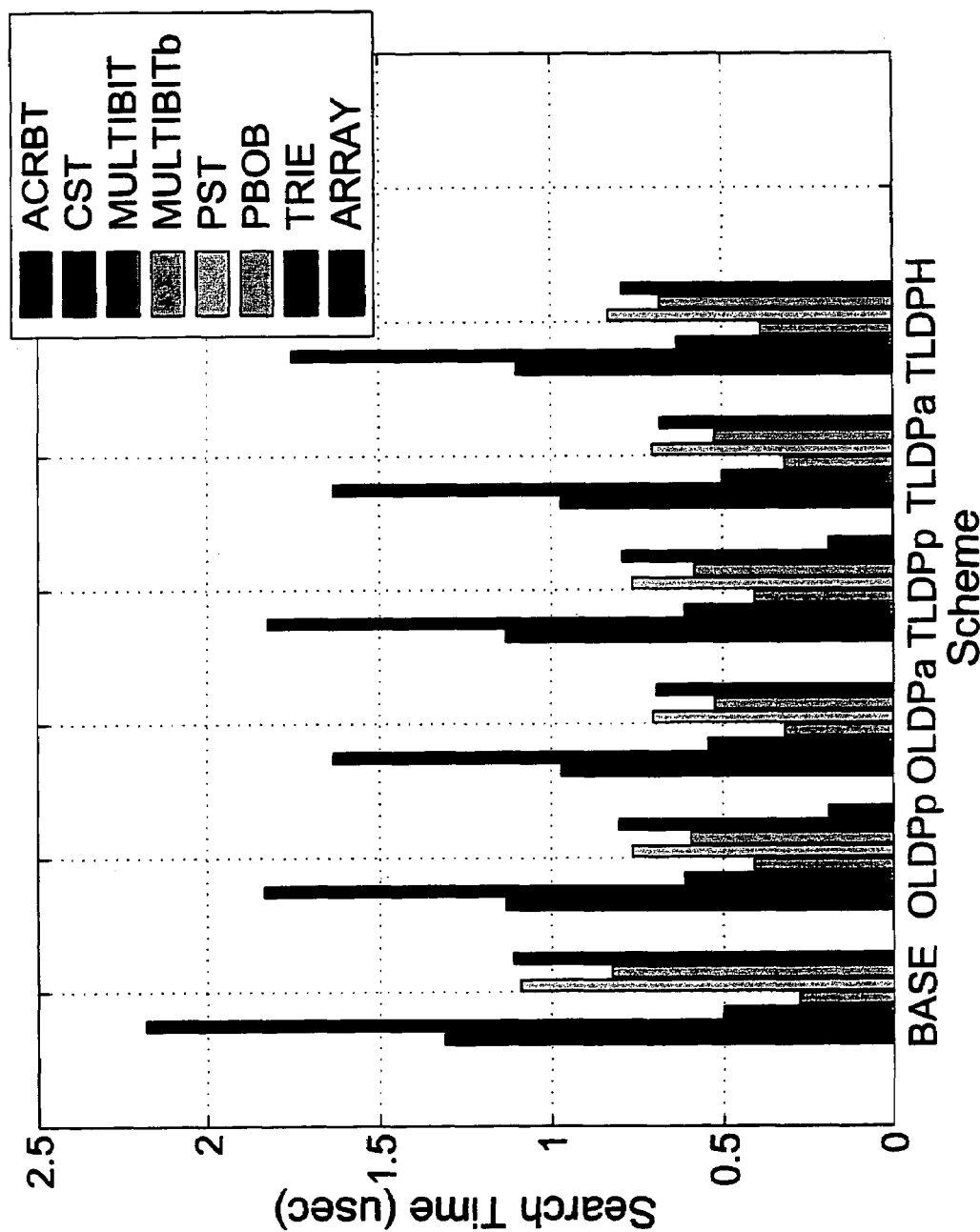
FIGS. 7A through 7D represent histograms of the average time for PAIX.
Figure 7B:
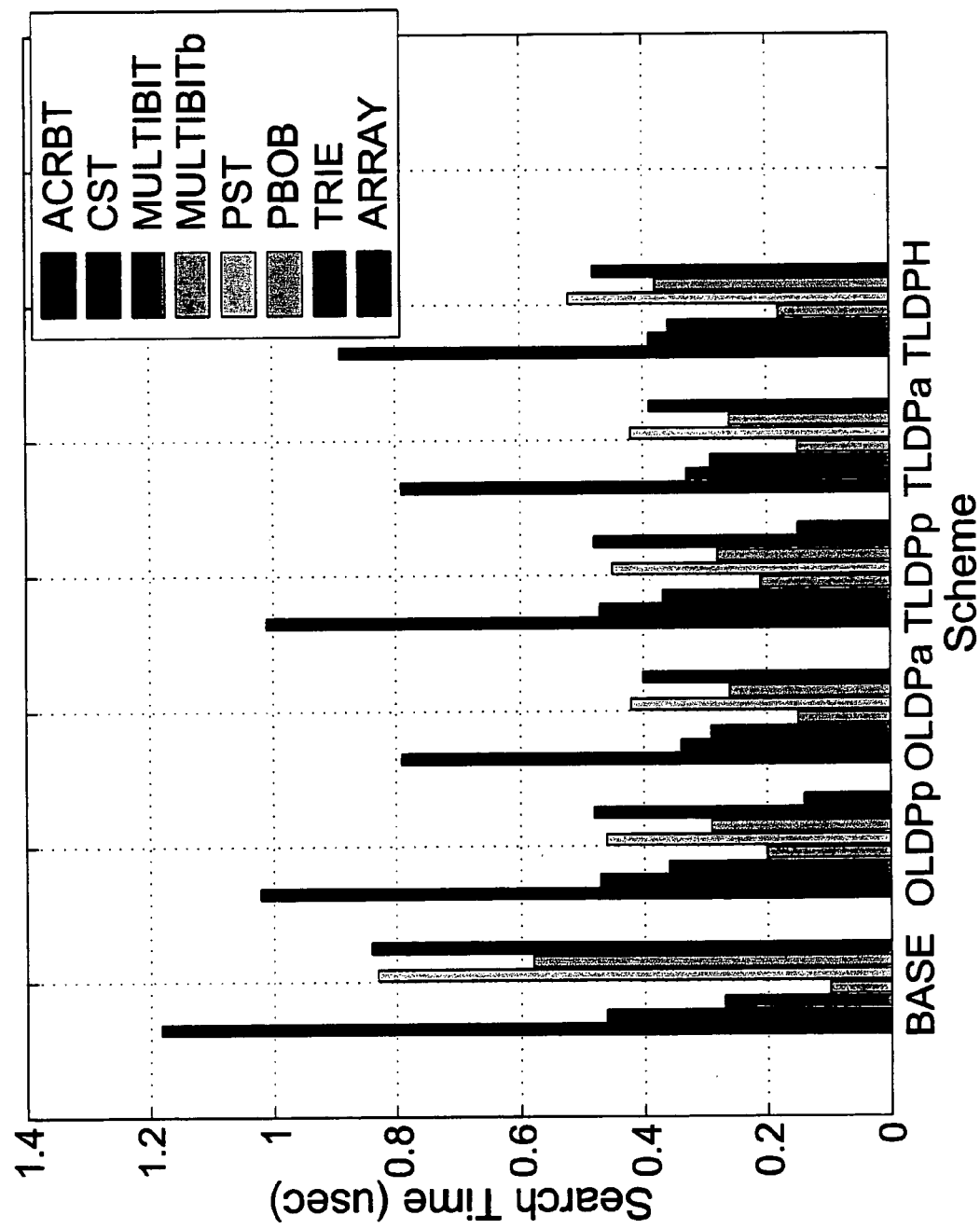
Figure 7C:
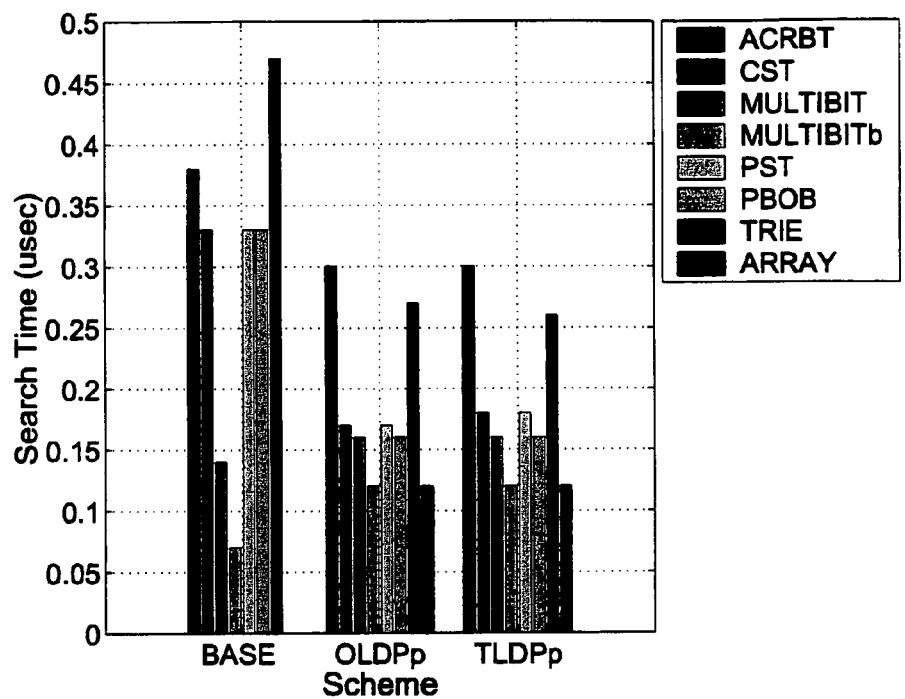
Figure 7D:
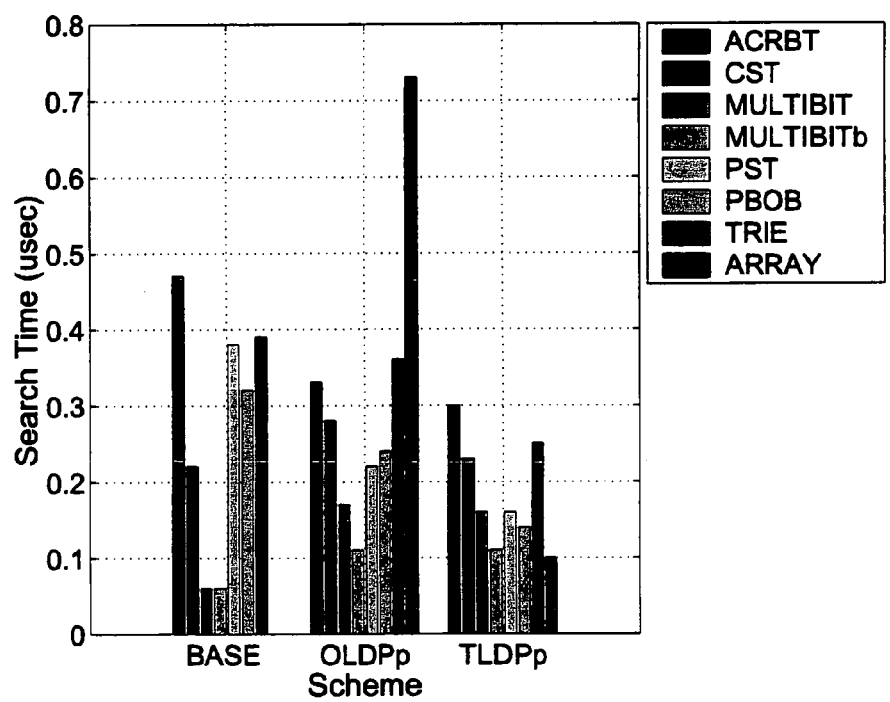

When the NONTRACE, PSEUDOTRACE and PSEUDOTRACE100 data sets were used, X1p and X2p have similar average search times. The same is true for X1a and X2a (the PSEUDOTRACE100 times for X1a and X2a are not reported). This result is not surprising since less than 1% of the prefixes have length less than 16. Hence, there is only a small probability that a destination address in NONTRACE and PSEUDOTRACE will require examination of OLDP[-1]. To demonstrate the effectiveness of the TLDP scheme, the search sequence PSEUDOTRACE100L16 was used in which search requires the examination of OLDP[-1]. The experimental data of Table 10 and FIG. 7D illustrate that the X2p schemes significantly outperform their X1p counterparts. For the Paix database, the average search time for ARRAY2p is 14% that for ARRAY1p whereas for PBOB2p, the time is 67% that for PBOB1p.

TABLE 10

Search time (in μsec) for PSUEDOTRACE100L16

| Scheme | Paix | Pb | Aads | MaeWest |
|---|---|---|---|---|
| ACRBT | 0.47 | 0.40 | 0.38 | 0.36 |
| CST | 0.22 | 0.21 | 0.21 | 0.26 |
| MULTIBIT | 0.06 | 0.06 | 0.05 | 0.06 |
| MULTIBITb | 0.06 | 0.04 | 0.05 | 0.05 |
| PST | 0.38 | 0.28 | 0.28 | 0.27 |
| PBOB | 0.32 | 0.21 | 0.25 | 0.24 |
| TRIE | 0.39 | 0.35 | 0.34 | 0.33 |
| ACRBT1p | 0.33 | 0.25 | 0.26 | 0.23 |
| CST1p | 0.28 | 0.26 | 0.28 | 0.27 |
| MULTIBIT1p | 0.17 | 0.15 | 0.16 | 0.16 |
| MULTIBITb1p | 0.11 | 0.11 | 0.11 | 0.11 |
| PST1p | 0.22 | 0.18 | 0.18 | 0.18 |
| PBOB1p | 0.24 | 0.19 | 0.19 | 0.19 |
| TRIE1p | 0.36 | 0.30 | 0.31 | 0.29 |
| ARRAY1p | 0.73 | 0.30 | 0.29 | 0.38 |
| ACRBT2p | 0.30 | 0.25 | 0.24 | 0.23 |
| CST2p | 0.23 | 0.22 | 0.22 | 0.21 |
| MULTIBIT2p | 0.16 | 0.14 | 0.14 | 0.14 |
| MULTIBITb2p | 0.11 | 0.11 | 0.10 | 0.10 |
| PST2p | 0.16 | 0.13 | 0.13 | 0.13 |
| PBOB2p | 0.14 | 0.13 | 0.12 | 0.12 |
| TRIE2p | 0.25 | 0.21 | 0.22 | 0.21 |
| ARRAY2p | 0.10 | 0.08 | 0.08 | 0.09 |

Insert Time

Figure 8:
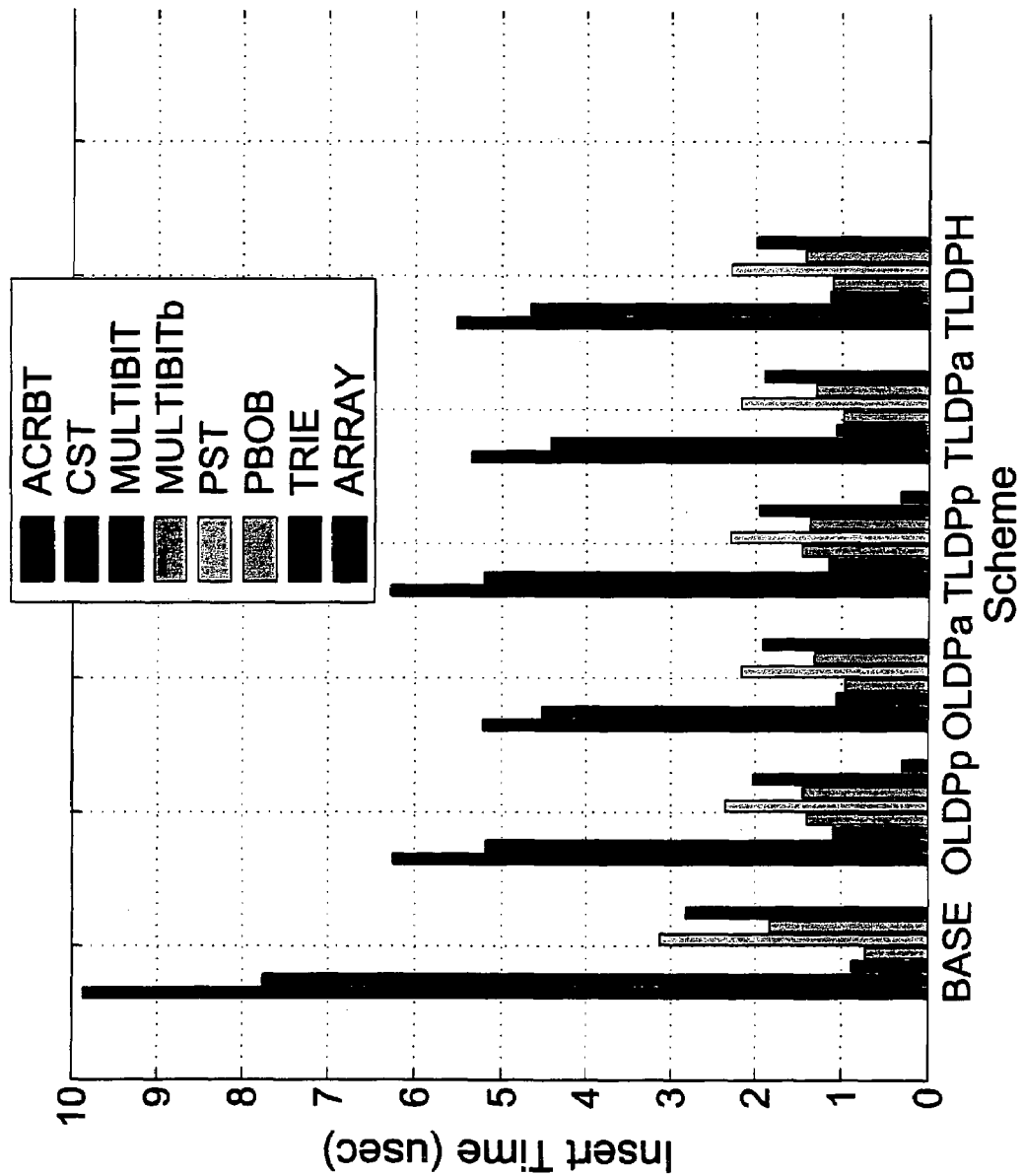
FIG. 8 is a histogram of the average prefix insertion time for PAIX.

To measure the average insert time for each of the data structures, a random permutation of the prefixes in each of the databases was obtained. Next, the first 75% of the prefixes in this random permutation were inserted into an initially empty data structure. The time to insert the remaining 25% of the prefixes was measured and averaged. This timing experiment was repeated 10 times. Tables 11 and 12 for Paix. FIG. 8 histograms the average times of Tables 11 and 12 for Paix.

TABLE 11

Average time to insert a prefix (in μsec)

| Scheme | Paix | Pb | Aads | MaeWest |
|---|---|---|---|---|
| ACRBT | 9.86 | 10.73 | 10.37 | 10.20 |
| CST | 7.76 | 6.35 | 5.95 | 5.90 |
| MULTIBIT | 0.88 | 0.95 | 0.97 | 0.96 |
| MULTIBITb | 0.73 | 1.07 | 1.22 | 1.26 |
| PST | 3.13 | 2.60 | 2.45 | 2.05 |
| PBOB | 1.83 | 1.54 | 1.48 | 1.23 |
| TRIE | 2.82 | 2.31 | 2.27 | 2.02 |
| ACRBT1p | 6.24 | 4.96 | 4.70 | 4.69 |
| CST1p | 5.18 | 4.16 | 3.98 | 4.00 |
| MULTIBIT1p | 1.10 | 1.17 | 1.24 | 1.13 |
| MULTIBITb1p | 1.40 | 2.33 | 2.58 | 2.52 |
| PST1p | 2.35 | 1.93 | 1.77 | 1.52 |
| PBOB1p | 1.44 | 1.17 | 1.10 | 0.94 |
| TRIE1p | 2.02 | 1.61 | 1.51 | 1.36 |

TABLE 11-continued

Average time to insert a prefix (in μsec)

| Scheme | Paix | Pb | Aads | MaeWest |
|---|---|---|---|---|
| ARRAY1p | 0.30 | 0.26 | 0.28 | 0.27 |
| ACRBT1a | 5.21 | 3.23 | 2.90 | 2.86 |
| CST1a | 4.52 | 2.77 | 2.40 | 2.38 |
| MULTIBIT1a | 1.06 | 0.88 | 0.98 | 0.75 |
| MULTIBITb1a | 0.95 | 0.91 | 1.01 | 0.90 |
| PST1a | 2.17 | 1.67 | 1.52 | 1.32 |
| PBOB1a | 1.31 | 0.98 | 0.91 | 0.76 |
| TRIE1a | 1.91 | 1.47 | 1.34 | 1.18 |
| ACRBT2p | 6.27 | 4.95 | 4.67 | 4.69 |
| CST2p | 5.21 | 4.12 | 3.95 | 4.00 |
| MULTIBIT2p | 1.15 | 1.26 | 1.29 | 1.26 |
| MULTIBITb2p | 1.46 | 2.50 | 2.64 | 2.56 |
| PST2p | 2.30 | 1.92 | 1.76 | 1.50 |
| PBOB2p | 1.37 | 1.15 | 1.08 | 0.93 |
| TRIE2p | 1.95 | 1.60 | 1.48 | 1.35 |
| ARRAY2p | 0.32 | 0.24 | 0.29 | 0.25 |
| ACRBT2a | 5.35 | 3.28 | 2.81 | 2.80 |
| CST2a | 4.42 | 2.73 | 2.41 | 2.34 |
| MULTIBIT2a | 1.06 | 0.97 | 0.96 | 0.92 |
| MULTIBITb2a | 0.98 | 1.00 | 1.10 | 0.98 |
| PST2a | 2.18 | 1.64 | 1.50 | 1.29 |
| PBOB2a | 1.30 | 1.00 | 0.90 | 0.75 |
| TRIE2a | 1.90 | 1.43 | 1.34 | 1.17 |

TABLE 12

Average time to insert a prefix (in μsec) (hash schemes)

| Scheme | Paix | Pb | Aads | MaeWest |
|---|---|---|---|---|
| ACRBT2aH | 5.53 | 3.54 | 3.10 | 3.01 |
| CST2aH | 4.67 | 2.98 | 2.60 | 2.54 |
| MULTIBIT2aH | 1.13 | 1.09 | 1.04 | 0.99 |
| MULTIBITb2aH | 1.10 | 1.08 | 1.17 | 1.06 |
| PST2aH | 2.29 | 1.75 | 1.59 | 1.42 |
| PBOB2aH | 1.42 | 1.08 | 0.97 | 0.85 |
| TRIE2aH | 1.99 | 1.53 | 1.42 | 1.25 |

The insert experiments demonstrate that ARRAY1p and ARRAY2p are performed with the least time. When the partitioning operation is performed using base structures whose worst-case performance is better than O(n), the PBOB2a, MULTIBIT2a and MULTIBITb2a structures are competitive in time and achieve the best time for this operation. For example, while an insert in the Paix database takes 19% less time when MULTIBIT2a is used than when a PBOB2a is used, that in the MaeWest takes 15% more time. Generally, the use of OLDP and/or TLDP of the present invention reduces the insert time. MULTIBIT1p, MULTIBITb1p, MULTIBIT2p, and MULTIBITb2p are exceptions, taking more time for inserts in each of the four databases. MULTEBIT1a, MULTIBITb1a, MULTIBIT2a, and MULTIBITb2a took more time than their base structures on some of the databases and less on others. The insert time for MULTIBIT is about 20% less than that for MULTIBIT1a. In contrast, the insert time for PBOB2a is between 29% and 39% less than that for PBOB.

Delete Time

Figure 9:
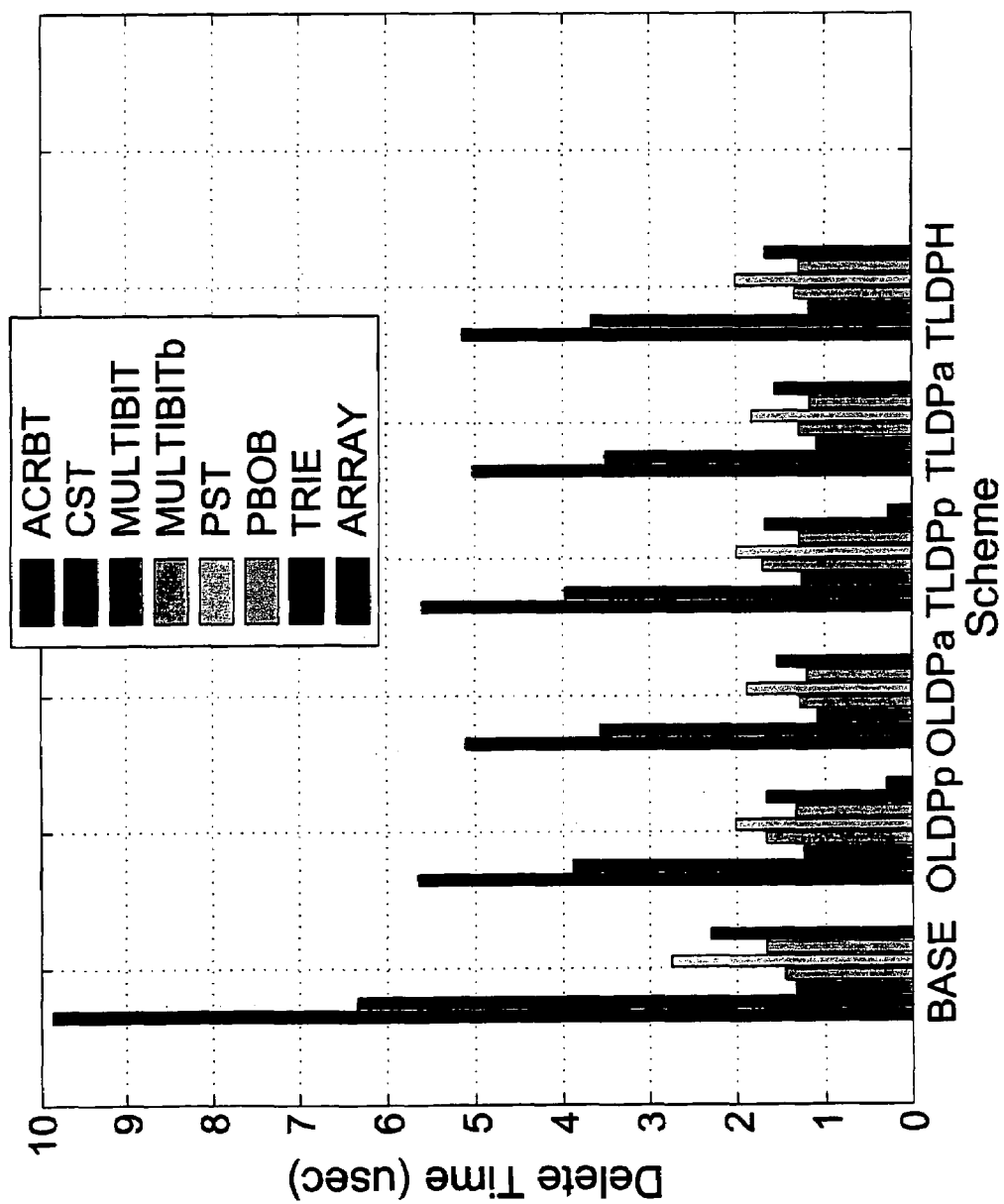
FIG. 9 is a histogram of the deletion time for PAIX.

To measure the average delete time, 25% of the prefixes was removed from the data structure for each database. The prefixes to delete were determined using the permutation generated for the insert time test; the last 25% of these were deleted. Once again, the test was run 10 times and the average of the averages computed. Tables 13 and 14 show the average time to delete a prefix over the 10 test runs. FIG. 9 histograms the average times of Tables 13 and 14 for Paix.

TABLE 13

Average time to delete a prefix (in μsec)

| Scheme | Paix | Pb | Aads | MaeWest |
|---|---|---|---|---|
| ACRBT | 9.86 | 10.73 | 10.37 | 10.20 |
| CST | 6.34 | 5.09 | 4.98 | 4.84 |
| MULTIBIT | 1.34 | 1.80 | 2.09 | 2.06 |
| MULTIBITb | 1.46 | 2.01 | 2.43 | 2.44 |
| PST | 2.74 | 2.27 | 2.12 | 1.74 |
| PBOB | 1.67 | 1.40 | 1.31 | 1.10 |
| TRIE | 2.30 | 1.81 | 1.75 | 1.58 |
| ACRBT1p | 5.64 | 4.33 | 4.03 | 3.97 |
| CST1p | 3.89 | 3.04 | 2.98 | 2.84 |
| MULTIBIT1p | 1.25 | 1.30 | 1.27 | 1.37 |
| MULTIBITb1p | 1.67 | 2.03 | 2.18 | 2.13 |
| PST1p | 2.01 | 1.69 | 1.55 | 1.33 |
| PBOB1p | 1.33 | 1.14 | 1.06 | 0.91 |
| TRIE1p | 1.67 | 1.27 | 1.18 | 1.11 |
| ARRAY1p | 0.30 | 0.24 | 0.20 | 0.22 |
| ACRBT1a | 5.10 | 3.31 | 2.68 | 2.71 |
| CST1a | 3.57 | 2.20 | 2.04 | 1.97 |
| MULTIBIT1a | 1.09 | 0.88 | 0.71 | 0.75 |
| MULTIBITb1a | 1.29 | 1.03 | 1.04 | 0.97 |
| PST1a | 1.88 | 1.41 | 1.27 | 1.14 |
| PBOB1a | 1.21 | 0.90 | 0.79 | 0.70 |
| TRIE1a | 1.55 | 1.14 | 1.05 | 0.90 |
| ACRBT2p | 5.60 | 4.20 | 3.92 | 3.92 |
| CST2p | 3.97 | 3.00 | 2.91 | 2.87 |
| MULTIBIT2p | 1.27 | 1.29 | 1.29 | 1.30 |
| MULTIBITb2p | 1.70 | 2.06 | 2.22 | 2.16 |
| PST2p | 2.00 | 1.69 | 1.56 | 1.32 |
| PBOB2p | 1.30 | 1.13 | 1.04 | 0.90 |
| TRIE2p | 1.68 | 1.26 | 1.18 | 1.08 |
| ARRAY2p | 0.28 | 0.24 | 0.21 | 0.22 |
| ACRBT2a | 5.02 | 3.09 | 2.75 | 2.67 |
| CST2a | 3.51 | 2.15 | 2.03 | 1.98 |
| MULTIBIT2a | 1.10 | 0.84 | 0.79 | 0.76 |
| MULTIBITb2a | 1.30 | 1.00 | 0.98 | 0.95 |
| PST2a | 1.83 | 1.40 | 1.29 | 1.11 |
| PBOB2a | 1.17 | 0.88 | 0.80 | 0.68 |
| TRIE2a | 1.57 | 1.14 | 1.04 | 0.86 |

TABLE 14

Average time to delete a prefix (in μsec) (hash schemes)

| Scheme | Paix | Pb | Aads | MaeWest |
|---|---|---|---|---|
| ACRBT2aH | 5.14 | 3.18 | 2.81 | 2.77 |
| CST2aH | 3.67 | 2.25 | 2.08 | 2.03 |
| MULTIBIT2aH | 1.18 | 0.91 | 0.87 | 0.84 |
| MULTIBITb2aH | 1.35 | 1.07 | 1.05 | 0.97 |
| PST2aH | 2.01 | 1.50 | 1.37 | 1.18 |
| PBOB2aH | 1.30 | 0.97 | 0.97 | 0.77 |
| TRIE2aH | 1.67 | 1.23 | 1.13 | 1.00 |

As can be seen, the use of OLDP and TLDP of the present invention generally resulted in a reduction in the delete time, with the exceptions being MULTIBITb1p and MULTIBITb2p with Paix and Pb. TLDP with array linear lists (i.e., the schemes X2a where X denotes a base scheme such as ACRBT) resulted in the smallest delete times for each of the tested base data structures. The delete time for MULTIBIT2a was between 19% and 62% less than that for MULTIBIT; for PBOB2a, the delete time was between 30% and 39% less than that for PBOB. As was the case for the search and insert operations, ARRAY1p and ARRAY2p have the least measured average delete time. From among the remaining structures, the delete time is the least for MULTIBIT1a, MULTIBIT2a and PBOB2a. For example, on the Paix database, a delete using MULTIBIT2a takes about 6% less time than when PBOB2a is used; on the MaeWest database, a delete using MULTIBIT2a takes about 12% more time than when PBOB2a is used.

EXAMPLE 1

OLDP and TLDP Application to Fixed-Stride Tries

A trie node whose stride is s has $2^s$ subtries, some or all of which may be empty. A fixed-stride trie (FST) is a trie in which all nodes that are at the same level have the same stride. The nodes at level i of an FST store prefixes whose length, length(i), is $\Sigma_{j=0}^{i} s_j$, where $s_j$ is the stride for nodes at level j. In certain instances, the present invention provides for the expansion of a prefix with a nonpermissible length to the next permissible length. In such instances, where a newly created prefix is a duplicate, natural dominance rules are applied to eliminate all but one occurrence of the prefix. Because duplicate prefixes are eliminated from the expanded prefix set, all prefixes are distinct.

Figures 10A, 10B, 11:
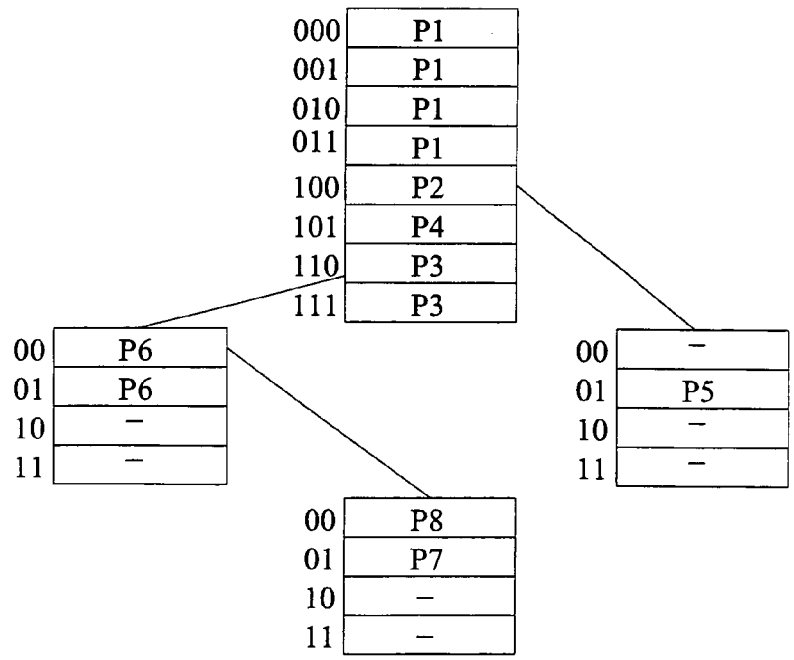
FIGS. 10A and 10B illustrate an exemplary prefix set and its expansion when applied to fixed-stride tries in accordance with the present invention.
FIG. 11 illustrates a fixed-stride trie for the expanded prefixes of FIG. 10B in accordance with the present invention.

By way of example, a set of prefixes is represented on an FST that has three levels, wherein the strides are 3, 2, and 2. The root of the trie stores prefixes whose length is 3; the level one nodes store prefixes whose length is 5 (3+2); and the level two nodes store prefixes whose length is 7 (3+2+2). This poses a problem for prefixes in which the length is different from the storeable length. For instance, suppose the length of a prefix is 2. In accordance with the present invention, the length of the prefix can be expanded to the next permissible length. FIG. 10A represents original prefixes and FIG. 10B shows the prefixes that result when the prefixes of FIG. 10A are expanded to lengths 3, 5, and 7. For example, in FIGS. 10A and 10B, P3=11* is expanded to P3a=110* and P3b=111*. If one of the newly created prefixes is a duplicate, natural dominance rules are used to eliminate all but one occurrence of the prefix. For instance, P7=110000* is expanded to P7a=1100000* and P7b=1100001*. However, P8=1100000* is to be chosen over P7a=1100000*, because P8 is a longer match than P7. So P7a is eliminated. Because the elimination of duplicate prefixes from the expanded prefix set, all prefixes are distinct. FIG. 11 illustrates the corresponding FST whose height is 2 and whose strides are 3, 2, and 2.

The FST of FIG. 11 can be searched with at most 3 memory references, thus demonstrating an improved time performance as compared to a 1-bit trie, which requires up to 7 memory references to perform a search for the prefix set of FIGS. 10A and 10B. For any given set of prefixes, the memory required by an FST of whose height is at most k depends on the strides of the up to k+1 levels in the FST. Algorithms have been developed to efficiently find the up to k+1 strides that result in most memory efficient FSTs. For dynamic router tables, however, the optimal strides change with each new insert or delete operation. Therefore, instead of maintaining optimality of strides dynamically, the strides must be fixed based on expected characteristics of the prefix set. The use of expected characteristics precludes the use of variable-stride tries.

To determine the strides of the FST for dynamic router tables, the distribution of prefixes in a database is examined. For example, the following Table 15 provides a distribution of the prefix set of FIGS. 10A and 10B in a Paix database. Fewer than 0.7% of the Paix prefixes have length <16.

TABLE 15

Distribution of prefixes in Paix

| Len | # of Prefixes | % of prefixes | Cumulative % of prefixes |
|---|---|---|---|
| 1 | 0 | 0.0000 | 0.0000 |
| 2 | 0 | 0.0000 | 0.0000 |
| 3 | 0 | 0.0000 | 0.0000 |
| 4 | 0 | 0.0000 | 0.0000 |
| 5 | 0 | 0.0000 | 0.0000 |
| 6 | 0 | 0.0000 | 0.0000 |
| 7 | 0 | 0.0000 | 0.0000 |
| 8 | 22 | 0.0267 | 0.0257 |
| 9 | 4 | 0.0047 | 0.0303 |
| 10 | 5 | 0.0058 | 0.0362 |
| 11 | 9 | 0.0105 | 0.0467 |
| 12 | 26 | 0.0303 | 0.0770 |
| 13 | 56 | 0.0654 | 0.1424 |
| 14 | 176 | 0.2054 | 0.3478 |
| 15 | 288 | 0.3361 | 0.6839 |
| 16 | 6606 | 7.7099 | 8.3938 |
| 17 | 918 | 1.0714 | 9.4652 |
| 18 | 1787 | 2.0856 | 11.5509 |
| 19 | 5862 | 6.8416 | 18.3924 |
| 20 | 3614 | 4.2179 | 22.6103 |
| 21 | 3750 | 4.3766 | 26.9870 |
| 22 | 5525 | 6.4483 | 33.4353 |
| 23 | 7217 | 8.4230 | 41.8583 |
| 24 | 49756 | 58.0705 | 99.9288 |
| 25 | 12 | 0.0140 | 99.9428 |
| 26 | 26 | 0.0303 | 99.9732 |
| 27 | 12 | 0.0140 | 99.9872 |
| 28 | 5 | 0.0058 | 99.9930 |
| 29 | 4 | 0.0047 | 99.9977 |
| 30 | 1 | 0.0012 | 99.9988 |
| 31 | 0 | 0.0000 | 99.9988 |
| 32 | 1 | 0.0012 | 100.0000 |

Hence, using a root stride of 16 will require only a small percentage of the prefixes from length <16 to be expanded to length 16. Because using a larger stride for the root required the expansion of the 6606 prefixes of length 16, the root stride was set at 16. For the children and grandchildren of the root, a stride of 4 was chosen. Thus, the prefixes whose length is 17, 18, and 19 were expanded to length 20 and prefixes whose length is 21, 22, and 23 were expanded to length 24. The level 4 nodes were given a stride of 8, requiring the expansion of those prefixes whose length is between 25 and 31 to the length of 32. These stride choices result in a 16-4-4-8-FST (root stride is 16, level 1 and level 2 stride are 4, level 3 stride is 8). Since a 16-4-4-8 FST has 4 levels, the longest matching prefix may be found with at most 4 memory accesses. In other embodiments, a 16-8-8-FST or a 16-4-4-4-4-FST are used in accordance with the present invention.

To find the longest matching prefix using an FST containing the prefix partitioning scheme of the present invention, the bits of d are used to follow a path from the root of the FST toward a leaf. The last prefix encountered along this path is the longest matching prefix. For example, to determine the longest matching prefix for 1100010 from the 3-2-2-FST of FIG. 10B, the first three bits (110) are used to obtain the left level 1 node, as illustrated in FIG. 11. The next two bits (00) are used to reach the level 2 node. The final remaining last 2 bits (10) fall off the trie. The prefixes encountered on this path are P3 (in the root) and P6 (in the level 1 node; node that no prefix is encountered in the 10 fields of the level 2 node). The last prefix encountered is P6. Hence the longest matching prefix for 1100010 is P6.

To insert the prefix p, a search path determined by the bits of p is followed until the level i node N with property length $(i-1) < \text{length}(p) \leqq \text{length}(i)$ (i.e., assume that length $(-1)=0$, is reached). Where a node N is not in the trie, empty nodes are added to the trie. The prefix p is then expanded to length length(i) and stored in the node slots for each of the expanded prefixes. Where a slot is already occupied, p is stored in the occupied spot only if it is longer than the prefix occupying the node.

To facilitate the delete operation, each node M of an FST maintains an auxiliary Boolean array M.prefixes[0:$2^s$–1], where s is the stride of M. This array keeps track of the prefixes inserted at node M. When prefix p is inserted, N.prefixes[q] is set to true. q is $2^{length(p)-length(i-1)}$+number(i,p)–2, where (i,p) is a number represented by bits length(i-1) . . . length(p)-1 of p (the bits of p are indexed from left to right beginning with the index 0). For example, the bit-sequence 010 represents the number 2. An alternative to the array M.prefixes[ ] is to keep tack of the prefixes inserted at node M using a trie on bits length(i-1) . . . of the inserted prefixes.

To delete the prefix p, the node N is identified in the same fashion as that for an insertion operation described above. N.prefixes[q] is set to false, where q is computed as described above. To update the prefix slots of N that contain p, the longest proper prefix of p that is in N.prefixes is identified. This longest proper prefix is determined by examining N.prefixes[j] for j=$2^{r-length(i-1)}$+number (i,$p_r$)–2, r=length(p)–1, length(p)–2, . . . , length(i–1)+1, where $p_r$ is the first r bits of p. The examination stops at the first j for which N.prefixes [j] is true. The corresponding prefix replaced p in the prefix slots of N. If there is no such j, the null prefix replaces p.

Since the root stride is 16, for the recommended IPv4 FSTs (16-4-4-8, 16-4-4-4-4, and 16-8-8) and since s=16 is recommended for IPv4, by way of example, an OLDP 16-4-4-4-4 FST has the structure shown in FIG. 1 with each OLDP[i], i≧0 being a 4-4-4-4 FST; OLDP[–1] is a 4-4-4-3 FST. The root of each 4-4-4-4 FST, while having a stride of 4, needs to account for prefixes of length 16 through 20.

In contrast, a TLDP 16-4-4-4-4 FST has the structure of FIG. 4 with each OLDP[i], i≧0 being a 4-4-4-4 FST; each TLDP[i], i≧0 is a 4-3-FST; and TLDP[–1] is a 4-3-FST. The root of each TLDP[i] 4-3-FST, while having a stride of 4, needs to account for prefixes of length 8 through 12.

EXAMPLE 2

Prefix Partitions Using Binary on Binary (BOB) Tree for a Nonintersecting Highest Priority Rule Table (NHRT)

The present invention contemplates using both dynamic and static data structures for any prefix partition to provide the most efficient routing performance while ensuring economic memory storage. In one embodiment, the present invention combines a top level balanced binary search tree called a point search tree (PTST) with lower level range search trees (RST's) in NHRT-type dynamic router data structures for partitions to reduce the processing time required to search, insert, and delete prefixes. The PTST can be any standard red-black binary search tree, or any other binary search tree structure that supports efficient search, insert and delete methods as known in the art.

In a preferred embodiment, the PTST is any standard balanced binary search tree that has at most 2n nodes, with each node z associated with a point, point(z). On every node z of the PTST, nodes in the left of the subtree of z have smaller point values than point(z), and nodes in the right subtree of z have larger point values than point(z). Where R is the set of nonintersecting ranges of the NHRT, each range of R is stored in exactly one of the nodes of the PTST. Thus, the root of the PTST stores (1) all ranges r ∈ R such that start(r) ≦point (root)≦finish(r); (2) all ranges r ∈ R such that finish(r)<point (root) are stored in the left subtree of the root; and (3) all ranges r ∈ R such that point(root)<start(r) (i.e., the remaining ranges of R) are stored in the right subtree of the root, hereinafter referred to as the "range allocation rule." The ranges allocated to the left and right subtrees of the root are allocated to nodes in these subtrees using the range allocation rule recursively.

Figure 12A:
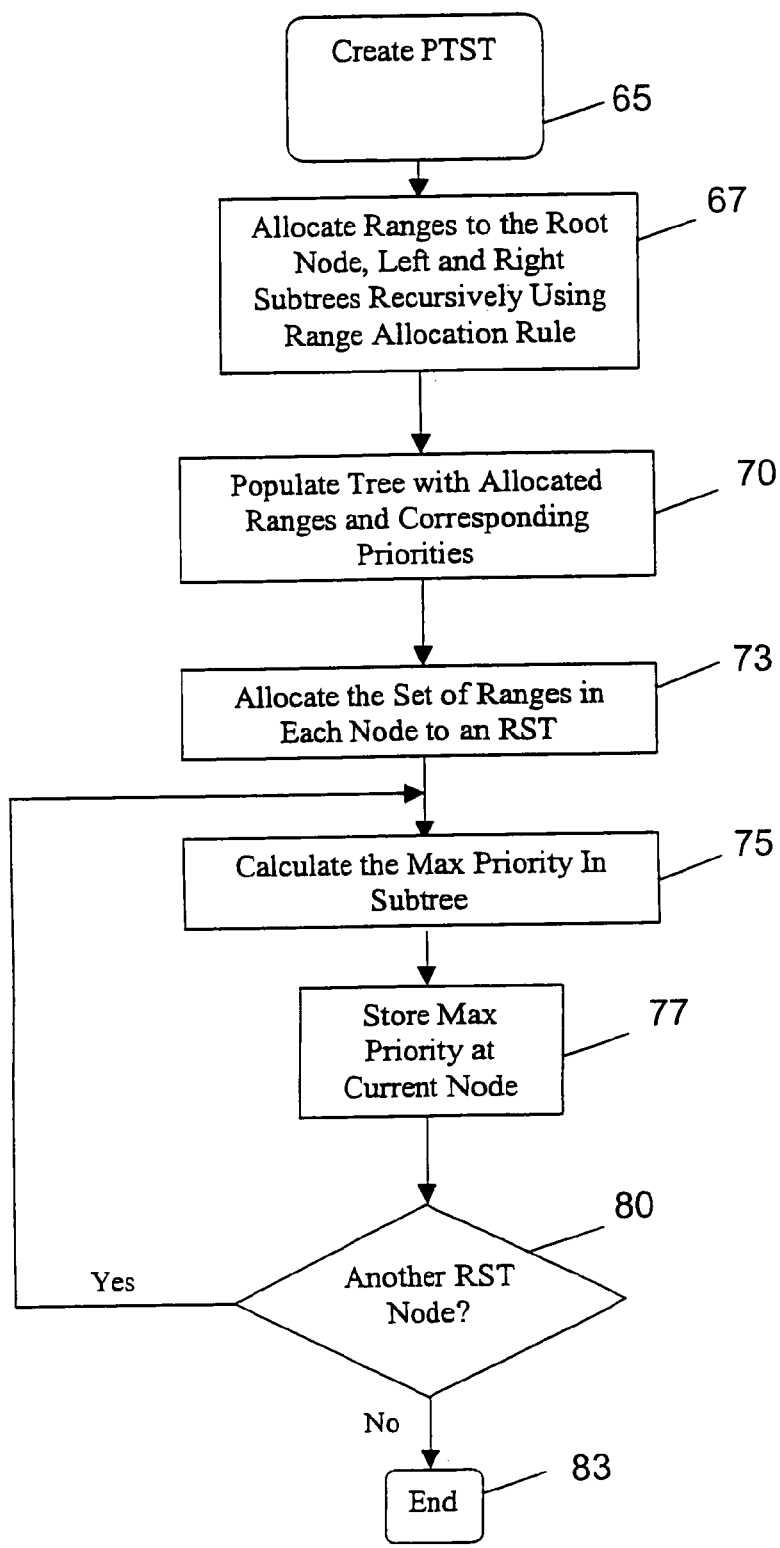
FIG. 12A is a flow chart illustrating the steps for creating and populating a binary on binary (BOB) tree for a Nonintersecting Highest Priority Rule Table (NHRT).
Figure 12B:
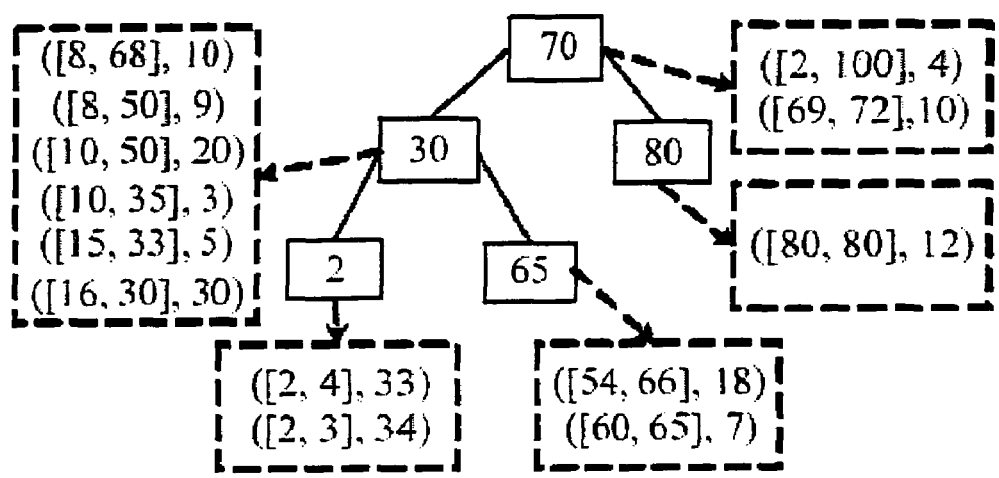
FIG. 12B is an illustration of an exemplary PTST for a set of ranges.

Referring now to FIGS. 12A and 12B, a PTST is created 65 and assigned node point values using the range allocation rule, wherein nodes in the left subtree have smaller point values than the root node, and nodes in the right subtree have larger point values than the root node. Next, the nonintersecting ranges are allocated 67 to the nodes of the newly created PTST, wherein all ranges containing the point value of the root node are stored in the root node. Further, all ranges having a finish point less than the chosen root node are stored in the left subtree of the root node, and all ranges having a start point greater than the chosen root node are stored in the right subtree of the root node. The PTST is then populated with the allocated ranges and corresponding priorities 70. The following Table 16 provides an example set of non-intersecting ranges and FIG. 12B illustrates a possible PTST for the set of ranges provided in Table 16.

TABLE 16

A non-intersecting range set

| Range | Priority |
| --- | --- |
| [2, 100] | 4 |
| [2, 4] | 33 |
| [2, 3] | 34 |
| [8, 68] | 10 |
| [8, 50] | 9 |
| [10, 50] | 20 |
| [10, 35] | 3 |
| [15, 33] | 5 |
| [16, 30] | 30 |
| [54, 66] | 18 |
| [60, 65] | 7 |
| [69, 72] | 10 |
| [80, 80] | 12 |

Next, subsets of the ranges are further allocated to another tree structure, such as a red-black tree, at each node in the PTST 73. This red-black tree, each node of which stores exactly one range, is then called a range search-tree or RST(z). Each node of the resulting RST stores exactly one range. This range is also referred to herein as range(x). Further, each node includes a maximum of the priorities of the ranges associated with the nodes in the subtree rooted at that node 75, wherein the maximum priority is the given priority if the node is a leaf, or the maximum of the left child, right child, and given priority, if the node is not a leaf. The calculated maximum priority (mp(x)) is stored at the current node 77, and the traversal process continued for each RST node 80 until the tree is filled 83. The maximum priority may be defined recursively as below:

$$mp(x) = \begin{cases} p(x) & \text{if } x \text{ is a leaf} \\ \max\{mp(leftChild(x)), mp(rightChild(x)), p(x)\} & \text{otherwise} \end{cases}$$

where $p(x) = priority(range(x))$.

Figure 13:
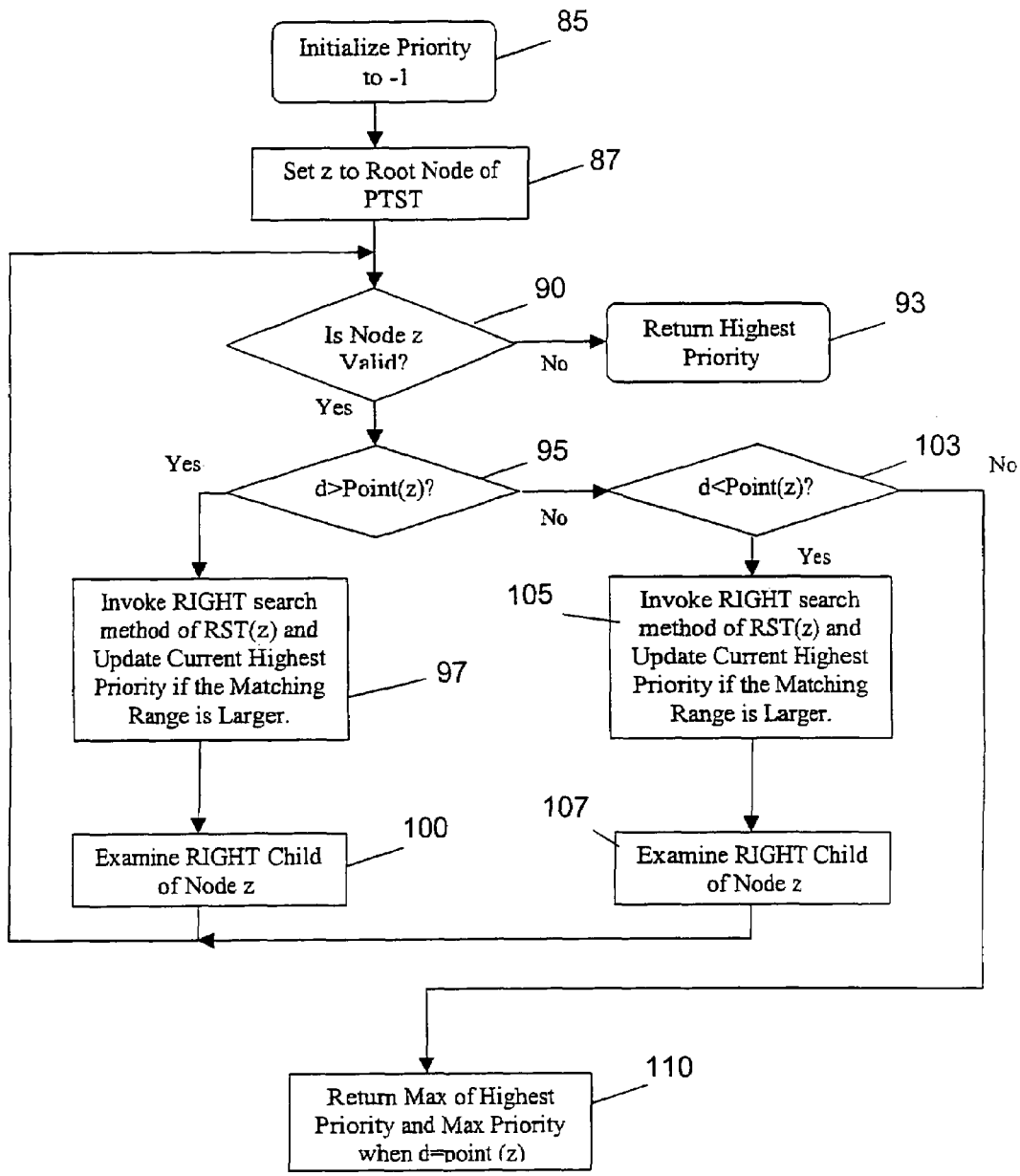
FIG. 13 is a flow chart illustrating the steps for finding the highest priority range for a given destination address in a BOB tree for an NHRT.

Using the BOB, the highest priority ranges that matches a given destination address (d) is found by following a search path from the root of the PTST toward a leaf of the PTST. FIG. 13 provides a flow chart for the process. The process begins by initializing the priority to a value (i.e., a value of −1 when all priorities are ≧zero) 85 and setting a node, z, to the root node of the PTST 87. Next, if node z is not a valid node 90, the process returns the highest priority 93. If node z is a valid node in step 90, the PTST is then searched to find matching ranges. If d is greater than the point value of node z of the PTST 95, then the right search method is invoked for matching ranges in the associated RST, and the current highest priority value updated accordingly 97. Next, the right child of node z is examined 100 as the process continues at step 90.

Alternatively, if d is not greater than the point value of node z of the PTST in step 95, and the point value of node z is greater than d 103, then the left search method is invoked for matching ranges in the associated RST, and the current highest priority value updated accordingly 105. Next, the left child of node z is examined 107 as the process continues at step 90.

If d is equal to the node value in step 103, the highest priority value is computed as the maximum of the current highest priority value and the maximum priority of the RST root node of the current PTST node, and the highest priority value is returned 110.

An exemplary lookup algorithm of the highest-priority range that matches destination address d according to the present invention might be:

```
Algorithm hp(d) {
    // return the length of hpr(d)
    // easily extended to return hpr(d)
    hp = -1; // assuming 0 is the smallest priority value
    z = root; // root of PTST
    while (z != null) {
        if (d>point(z)) {
            RST(z)->hpRight(d, hp);
            z = rightChild(z);
        }
        else if (d < point(z)) {
            RST(z)->hpLeft(d, hp)
            z = leftChild(z);
        }
        else // d == point(z)
            return max {hp, mp(RST(z_=>root)};
    }
    return hp;
}
```

With reference to the exemplary algorithm described above, the complexity of the invocation "RST(z)->hpRight (d,hp)" can be observed to be O(height(RST(z)) O(log n). Consequently, the complexity of hp(d) is O(log$^2$n). Determination of the highest-priority range that matches destination address d (hpr(d)) requires the addition of code to the methods hp(d), hpRight(d, hp), and hp Left(d, hp) so as to keep track of the range whose priority is the current value of hp. Thus, hpr(d) may be found in O(log$^2$n) time.

Figure 14A:
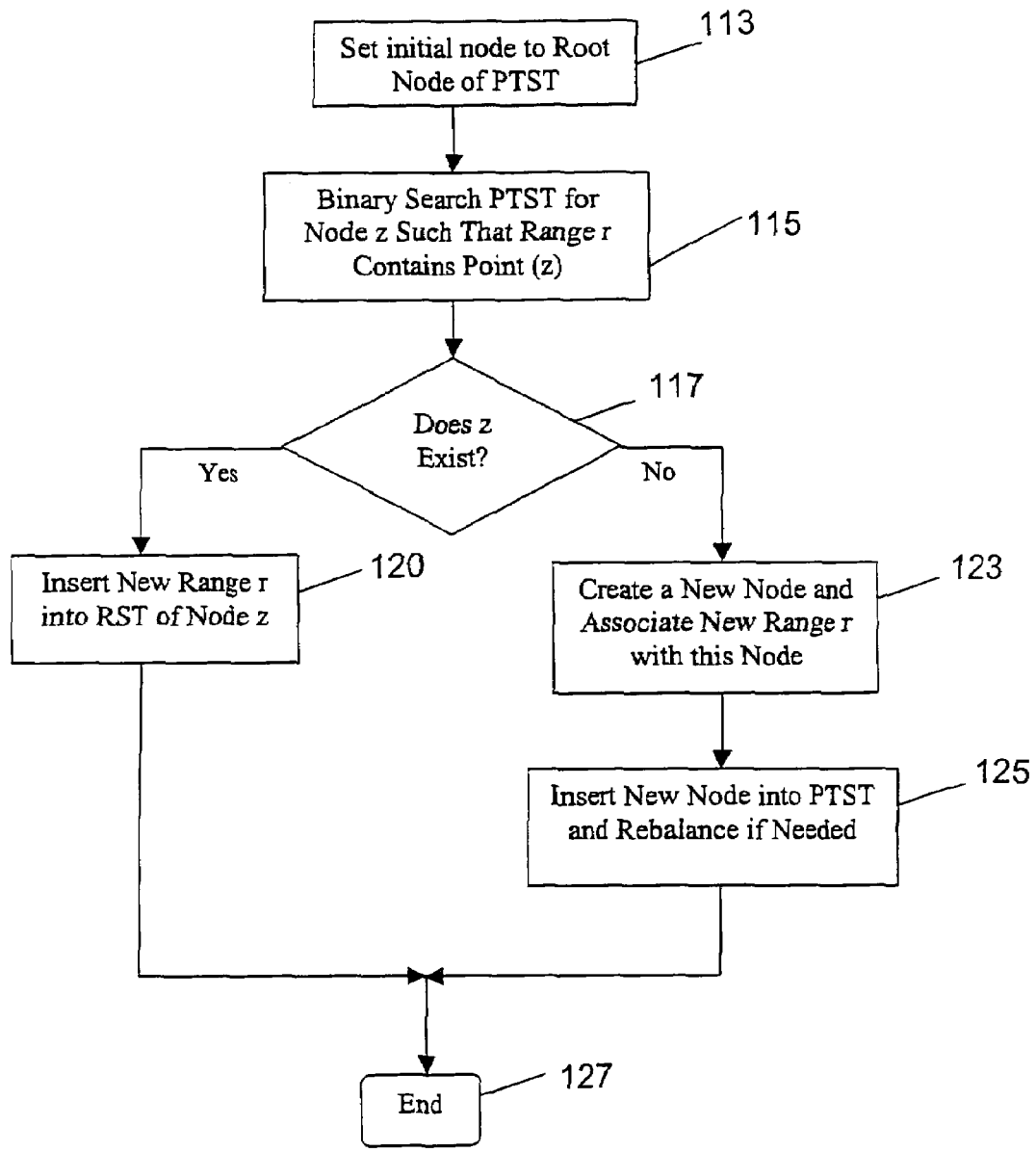
FIG. 14A is a flow chart illustrating the steps for inserting a new range in a BOB tree for an NHRT.

According to an embodiment of the invention, a range (r) that is known to have no intersection with any of the existing ranges in the router table, can be efficiently inserted into the table. As shown in the flow chart of FIG. 14A, the process begins by setting the initial node to the root node of the PTST 113. The PTST is then searched to find a node z such that r contains point (z) 115. If such a PTST node z exists 117, the range r is inserted into the RST of the node z 120 and the process ends 127. If no node z exists in step 117, than a new node is created and associated with new range r 123. Next, the new node is inserted into the PTST and the PTST tree is rebalanced if needed 125 (see Horowitz et al., *Fundamental of Data Structures in C++*, W. H. Freeman, NY, 653 pages (1995)). The rebalancing step may require color changes and at most one rotation. The process then ends in step 127.

In accordance with the present invention, the following is an exemplary algorithm to insert a nonintersecting range:

```
Algorithm insert(r) {
    // insert the nonintersecting range r
    z = root; // root of PTST
    while (z != null) {
        if (finish(r) < point(z))
            z = leftChild(z);
        else if (start(r) > point(z))
            z = rightChild(z);
        else { // r matches point(z)
            RST(z)->insert(r);
            return
        }
    }
    // there is no node z such that r matches point(z)
    // insert a new node into PTST
    insertNewNode(r);
}
```

Exclusive of the time required to perform the tasks associated with a rebalancing rotation, the time required to insert a range is O(height(PTST))=O(log n). As described below, a rebalancing rotation can be performed in O(log n) time. Since at most one rebalancing rotation is needed following an insert, the time to insert a range is O(logn). When it is necessary to verify that the range to be inserted does not intersect an existing range, the PTST can be augmented with priority search trees that can be used for intersection detection. The overall complexity of an insert remains O(log n).

Figure 14B:
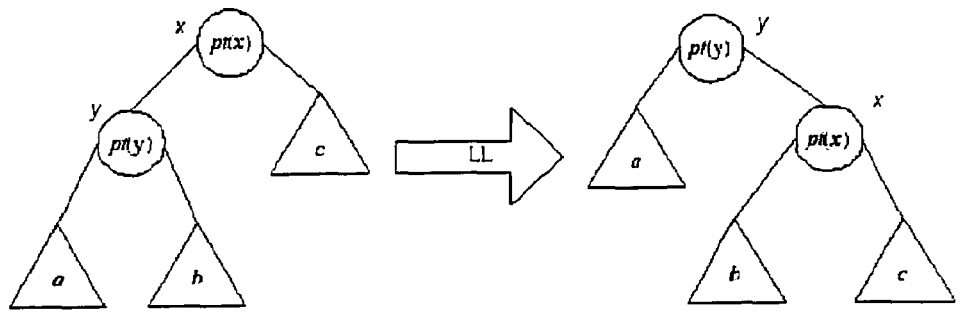
FIGS. 14B and 14C illustrate rotations used to rebalance a tree structure following an insertion or deletion of a range in accordance with the present invention.
Figure 14C:
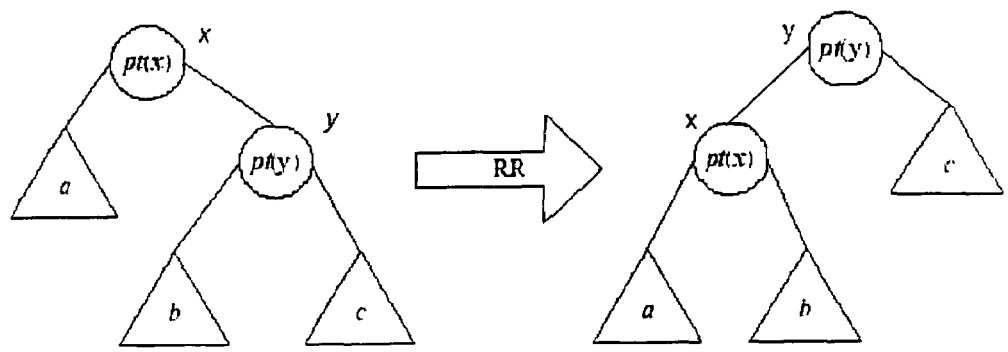

FIGS. 14B and 14C show the red-black LL and RR rotations, respectively, used to rebalance a red-black tree following an insert of a nonintersecting range, as previously described, or a delete, described below. In these figures, pt( ) is an abbreviation for point( ). Because the remaining rotation types, LR and RL, may, respectively, be viewed as an RR rotation followed by an LL rotation and an LL rotation followed by an RR rotation, it suffices to examine LL and RR rotations alone.

Using the following lemma (and corresponding proof), a red-black tree can be rebalanced using LL or RR rotations.

Lemma: R is a set of nonintersecting ranges and ranges(z) ⊆ R are the ranges allocated by the range allocation rule to node z of the PTST prior to an LL or RR rotation. Let ranges'(z) be this subset for the PTST node z following the rotation. ranges(z)=ranges'(z) for all nodes z in the subtrees a, b, and c of FIGS. 14B and 14C.

Proof: consider an LL rotation. ranges(subtree(x)) is the union of the ranges allocated to the nodes in the subtree whose root is x. Thus, the range allocation rule allocates each range r to the node z nearest the root such that r matches point(z), ranges(subtree(x))=ranges'(subtree(y)). Further, r ∈ ranges(a) if r ∈ ranges(subtree(x)) and finish(r)<point(y). Consequently, r ∈ ranges'(a). From this and the fact that the LL rotation does not change the positioning of nodes in a, it follows that for every node z in the subtree a, ranges(a)=ranges'(a). The proof for the nodes in b and c as well as for the RR rotation is similar.

With reference to FIGS. 14B and 14C, it follows from the previously described Lemma that ranges(z)=ranges'(z) for all z in the PTST except possibly for z ∈ {x, y}. Thus, ranges'(y)= ranges(y)∪ S and ranges'(x)=ranges(x)-S, where S={r|r ∈ ranges(x) ˆ start(r)≦point(y)≦finish(r)}. Because the ranges are nonintersecting ranges, all ranges in ranges(y) are nested within the ranges of S. In addition, the range rMax of S with largest start( ) value may be found by searching RST(x) for the range with largest start( ) value that matches point(y).

Where RST(x) is a binary search tree of an ordered set of ranges, rMax may be found in O(height(RST(x)) time by following a path from the root downward. Where rMax does not exist, S=Ø, ranges'(x)=ranges(x) and ranges'(y)=ranges (y).

With the assumption that rMax exists, the operation may be "split" to extract from RST(x) the ranges that belong to S. The following split operation: RST(x)→split(small,rMax,big) separates RST(x) into an RST small of ranges<than rMax and an RST big of ranges>than rMax. Thus, RST'(x)=big and RST'(y)=join(small, rMax, RST(y)), where "join" (see Horowitz et al., *Fundamentals of Data Structures in C++*, W. H Freeman, NY, 653 pages (1995)) combines the red-black tree small with ranges <rMax, the range rMax, and the red-black tree RST(y) with ranges >rMax into a single red-black tree.

The standard split and join operations may require slight modification so as to update the mp values of affected nodes. This modification does not affect the asymptotic complexity, which is logarithmic in the number of nodes in the tree being split or logarithmic in the sum of the number of nodes in the two trees being joined, of the split and join operations. Therefore, the complexity of performing an LL or RR rotation (and hence of performing an LR or RL rotation) in the PTST is O(log n).

Figure 15:
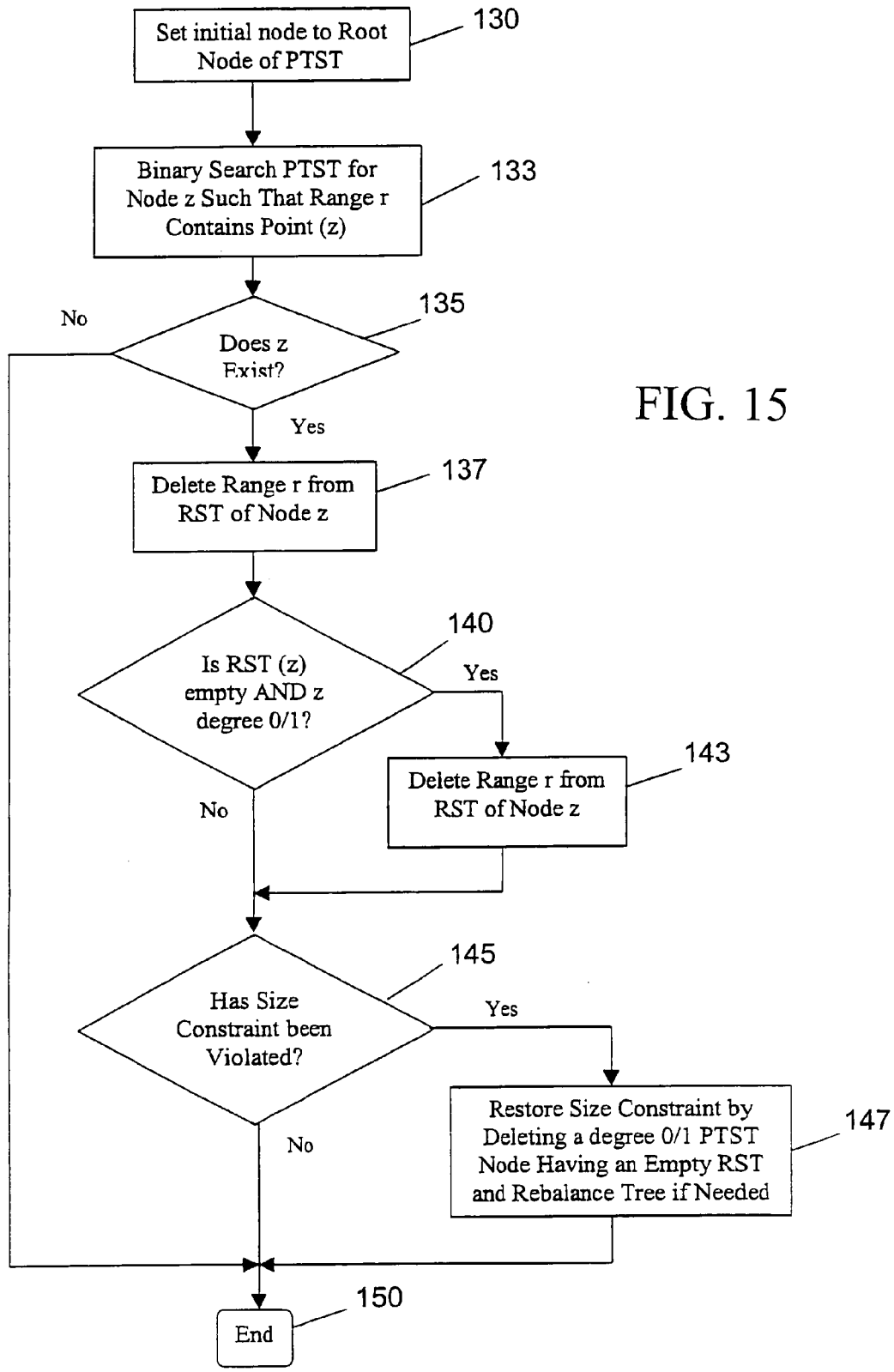
FIG. 15 is a flow chart illustrating the steps for deleting a range from a BOB tree for an NHRT.

Thus, ranges can also be efficiently deleted from router tables, as shown in the flow chart of FIG. 15. To delete range r, the deletion process begins by setting the initial node to the root node of the PTST 130. The PTST is then binary searched to find a PTST node z such that r contains point (z) 133. If such z does not exist 135, the process ends in step 150. If such z exists 135, the range r is deleted from RST(z) of node z 137. If RST(z) becomes empty as a result of a deletion and node z is a degree 0/1 node 140, node z is deleted from the PTST and the PTST rebalanced if needed 143 and processing continues with size constraint checking. If the deletion requires a rotation, the rotation may be performed as described above. If RST(z) is not empty as a result of a deletion, or node z is not a degree 0/1 node in step 140, processing continues with size constraint checking 145.

In step 145, the size constraint of the PTST needs to be checked to ensure that the constraint has not been violated. If the size constraint of the PTST has been violated as determined in step 145, the size of the PTST is restored by deleting a degree 0/1 PTST node with an empty RST and rebalancing the PTST as required 147. The restoring process is invoked, at most, twice and ends 150 after two iterations or until the size constraint has been restored. If the size constraint has not been violated in step 145, then the process ends in step 150.

An exemplary algorithm of the deletion of a range r according to the present invention might be:

```
Algorithm delete(r) {
    // delete the range r
    z = root; // root of PTST
    while (z != null) {
        if (finish(r) < point(z))
            z = leftChild(z);
        else if (start(r) > point(z))
            z = rightChild(z);
        else { // r matches point(z)
            RST(z)->delete(r);
            Cleanup(z);
            return
        }
    }
}
```

An exemplary algorithm to maintain size constraint following a deletion of a range r according to the present invention might be:

```
Algorithm cleanup(z) {
    // maintain size constraint
    if (RST(z) is empty and the degree of z is 0 or 1)
        delete node z from the PTST and rebalance;
    while (|PTST| > 2|R|)
        delete a degree 0 or degree 1 node z with empty
        RST(z) from the PTST and rebalance;
}
```

As a result of using BOB trees for NHRT-type dynamic routers, lookup, insert, and delete times are advantageously reduced. Specifically, the complexity of the BOB operations are O(lognlogmaxR) for lookup, O(logn) for insert, and O(logn) for delete.

EXAMPLE 3

Prefix Partitions Using Prefix Binary on Binary (PBOB) Tree for a Highest Priority Prefix Table (HPPT)

In another embodiment of the invention, dynamic router table structures, such as an HPPT, are used in at least one prefix partition. In a related embodiment, a PBOB tree is applied to an HPPT arrangement for at least one prefix partition. An array linear list is used in each node of a binary tree on binary tree (BOB) to provides a PBOB structure having reduced overhead requirements and efficient lookup.

Specifically, an array linear list is placed in each node z of a BOB PTST (see Sahni, S., *Data structures, algorithms, and applications in Java*, McGraw Hill, NY, 833 pages (2000)) of pairs of the form (pLength,priority), where pLength is a prefix length (i.e., number of bits) and priority is the prefix priority. ALL(z) has one pair for each range r ∈ ranges(x). The pLength value of this pair is the length of the prefix that corresponds to the range r and the priority value is the priority of the range r. The pairs in ALL(z) are in ascending order of pLength. Because the ranges in ranges(z) are nested and match point(z), the corresponding prefixes have different lengths.

Figure 16:
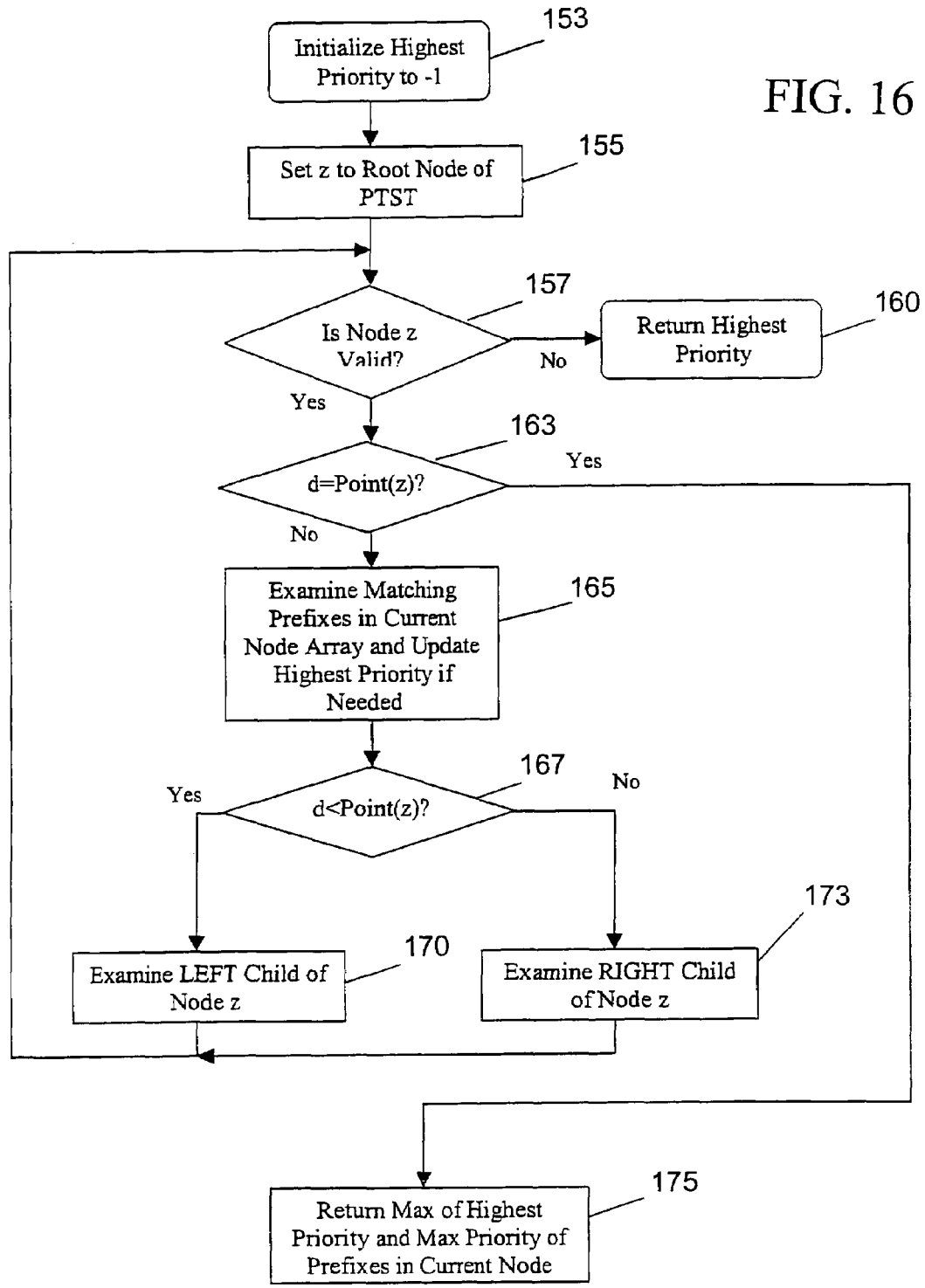
FIG. 16 is a flow chart illustrating the steps for finding the highest priority prefix for a given destination address in a Highest Priority Prefix Table (HPPT).

Referring now to FIG. 16, a flow chart is provided for finding the highest priority of the prefix in a PBOB that matches a destination address d. The process begins by initializing the priority to a value of −1 153 and setting the initial node to the root node of a PTST 155.

Next, if node z is not a valid node 157, the process returns the highest priority 160. If node z is a valid node in step 157, and d is not equal to point (z) 163, then the PTST is searched to find matching ranges. The array in the current node is then examined for a matching prefix and the highest priority value updated if needed 165, taking into account the priorities of those prefixes in the current node array that match d.

Examination of the array in the current node for a matching prefix (also referred to herein as the "searchALL (d,hp) method") utilizes the following lemmas: if a prefix in ALL(z) does not match a destination address d, then no longer-length prefix in ALL(z) matches d. The proof for this lemma assumes $p_1$ and $p_2$ are prefixes in ALL(z); that $l_i$ is the length of $p_i$; that $l_1 < l_2$; and that $p_1$ does not match d. Because both $p_1$ and $p_2$ match point(z), $p_2$ is nested within $p_1$. Therefore, all destination d addresses that are matched by $p_2$ are also matched by $p_1$. Accordingly, $p_2$ does not match d.

Determination of whether a length l prefix of ALL(z) matches d uses the following lemma: a length l prefix p of ALL(z) matches d if the most-significant l bits of point(z) and (d) are the same.

If d is less than the point value of node z of the PTST 167, then the left child of node z is examined 170 as the process continues at step 157. Alternatively, if d is not less than the point value of node z of the PTST in step 167, then the right child of node z is examined 173 as the process continues at step 157.

If d is equal to the point value of the current node in step 163, the highest priority value is computed as the maximum of the current highest priority value and the maximum priority of the prefixes of the current PTST node, and the highest priority value is returned 175.

In accordance with the present invention, the following is an exemplary lookup algorithm of the highest-priority prefix that matches the destination d:

```
Algorithm hp(d) {
    // return the priority of hpp(d)
    // easily extended to return hpp(d)
    hp = -1; // assuming 0 is the smallest priority value
    z = root; // root of PTST
    while (z != null) {
        if(d == point(z))
            return max {hp, ALL(z)->maxp( )};
        ALL(z)->searchALL(d,hp);
        if(d <point(z))
            z = leftChild(z);
        else
            z = rightChild(z);
    }
    return hp;
}
```

The entire tree is searched in the above described manner to find the priority of the highest prefix. After searching the tree, the routine returns the highest priority value.

With the assumption that masking operations can be performed in O(1) time for each operation, the number of PTST nodes reached in the "while (z!=null)" loop described in the algorithm above is O(logn) and the time spent at each node z that is reached is linear in the number of prefixes in ALL(z) that match d. Because the PTST has at most maxR prefixes that match d, the complexity of the previously described lookup method is O(logn+maxR)=O(W) time, where W is the length of the longest prefix, each.

In one embodiment, the prefixes in the array at a given node are stored in order of increasing length. In a preferred embodiment, rMax is determined by examining the prefixes in ALL(x) in increasing order of length; where ALL'(y) is determined by prepending the prefixes in ALL(x) whose length is ≦ the length of rMax. The time required to find rMax is O(maxRl). This period of time is also required to compute ALL'(y) and ALL'(x). Accordingly, the overall complexity of an insert/delete operation is O(logn+maxR)=O(g).

As a result of using PBOB trees for HPPT-type dynamic routers, lookup, insert, and delete times are advantageously reduced. Specifically, although the complexity of the disclosed PBOB operations are O(W) for lookup, O(W) for insert, and O(W) for delete, the cache misses of each operation are greatly reduced in comparison to trie.

EXAMPLE 4

Prefix Partitions Using Longest Matching Prefix Binary on Binary Tree (LMPBOB) for a Longest Matching Prefix Table (LMPT)

In accordance with the present invention, routing functions (i.e., lookup, delete, and insert) can be performed in each prefix partition using dynamic data structures. In one embodiment of the current invention, at least one prefix partition uses a LMPBOB tree for an LMPT. A PBOB as described above is used to represent an LMPT to obtain the same performance as for an HPPT. However, an advantageous reduction in the memory required for the data structure is expected to be realized by replacing the array linear list stored at each node of the PTST (of PBOB described above) by a W-bit vector, bit. bit(z)[i] denotes the ith bit of the bit vector stored in node z of the PTST, bit(z)[i]=1 if ALL(z) has a prefix whose length is i. W-bit vectors have been discussed by Suri et al. in their data structures ("Scalable IP lookup with fast updates," GLOBECOM (2001)).

Figure 17:
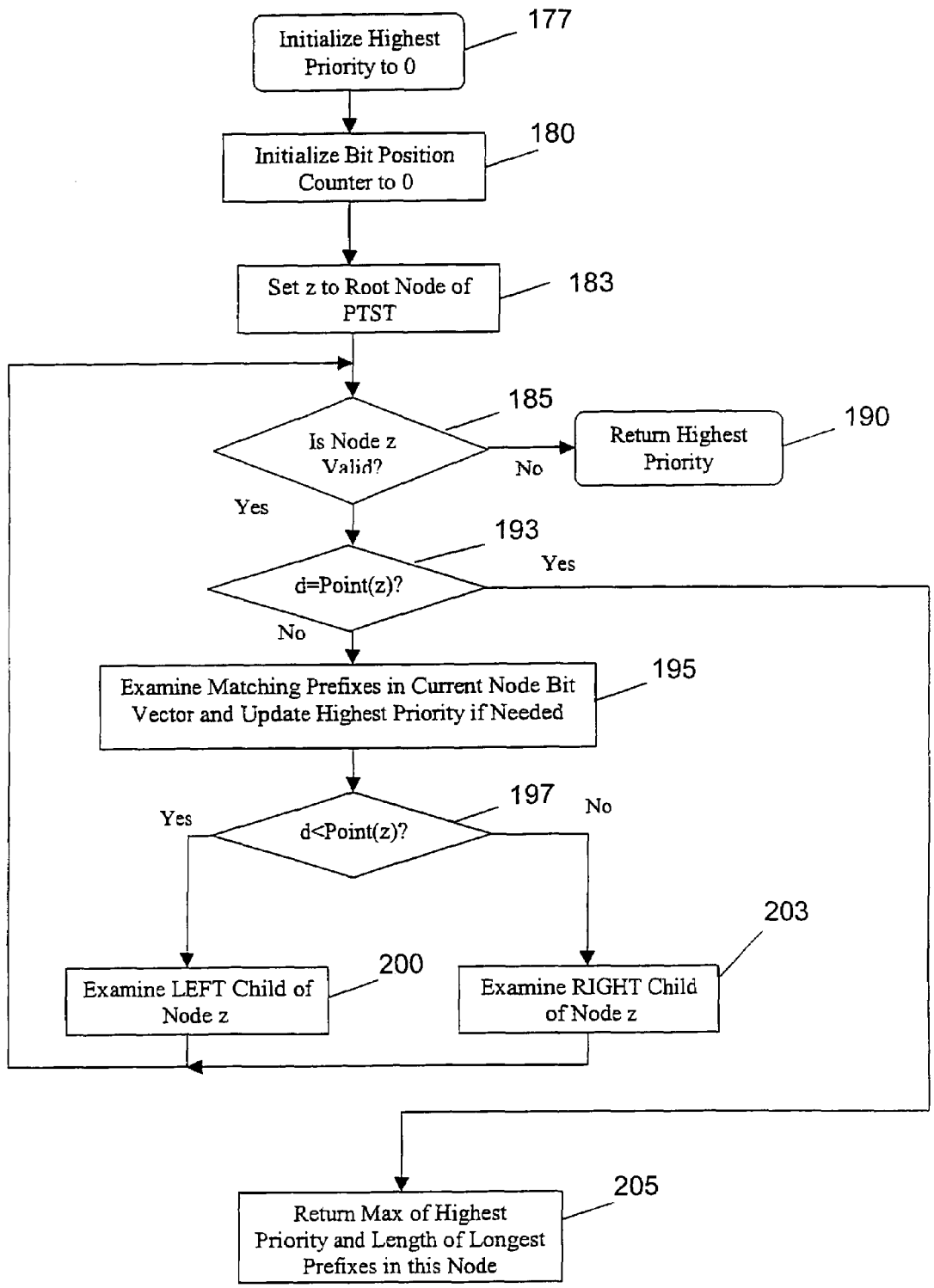
FIG. 17 is a flow chart illustrating the steps for finding the longest matching prefix for a given destination address in a Longest Matching Prefix Table (LMPT).

Referring now to FIG. 17, a flow chart is provided for finding the priority of the longest matching prefix in a LMPBOB that matches a destination address d. The process begins by initializing the highest priority to a value, such as zero (0) 177, initializing a bit position counter to a value, such as zero (0) 180, and setting the initial node to the root node of a PTST 183.

Next, if node z is not a valid node 185, the process returns the highest priority 190. If node z is a valid node in step 185, and d is not equal to point(z) 193, then the PTST is searched to find matching ranges. The current node bit vector is examined for a matching prefix and the highest priority value updated if needed 195, taking into account the priorities of those prefixes in the current node bit vector that match d. Where d is less than the point value of node z of the PTST 197, then the left child of node z is examined 200 as the process continues at step 185. Alternatively, if d is not less than the point value of node z of the PTST 197, then the right child of node z is examined 203 as the process continues at step 185.

If destination d is equal to the point value of the current node in step 193, the highest priority value is computed as the maximum of the current highest priority value and the length of the longest prefixes in the current PTST node, and the highest priority value is returned 205.

The examination of the current node bit vector for a prefix that matches d and the highest priority value (also referred to herein as the "search method") utilizes the following lemmas: (1) if bit(z)[i] corresponds to a prefix that does not match the destination address d, then bit(z)[j],j>i corresponds to a prefix that does not match d, and (2) let w and z be two nodes in a PTST such that w is a descendent of z and suppose that z->bit(q) corresponds to a prefix $p_q$ that matches d; w->bit(j), j≦q cannot correspond to a prefix that matches d.

The proof for lemma (1) is that bit(z)[q] corresponds to the prefix $p_q$ whose length is q and which equals the q most significant bits of point(z). So, $p_i$ matches all points that are matched by $p_j$. Therefore, if $p_i$ does not match d, $p_j$ does not match d either. The proof for lemma (2) begins with the supposition that w-> bit(j) corresponds to the prefix $p_j$, $p_j$ matches d, and j≦q. So, $p_j$ equals the j most significant bits of d. Since $p_q$ matches d and also point(z), d and point(z) have the same q most significant bits. Therefore, $p_j$ matches point(z). So, by the range allocation rule, $p_j$ should be stored in node z and not in node w, a contradiction.

The evaluation of whether a prefix matches d can be implemented using masks and Boolean operations so as to have complexity O(1). Since a bit vector has the same number of bits as does a destination address, this assumption is consistent with the implicit assumption that arithmetic on destination addresses takes O(1) time. The total time spent in all invocations of the search method is O(W+logn). The time spent in the remaining steps of lmp(d) is O(logn). Therefore, the overall complexity of lmp(d) is O(W+logn)=O(W). Although the time complexity is O(W), the number of cache misses is O(logn) where each bit vector takes the same amount of space as needed to store a destination address.

An exemplary lookup algorithm of the longest matching prefix for destination d according to the present invention might be:

```
Algorithm lmp(d) {
    // return the length of lmp(d)
    // easily extended to return lmp
    hp = 0; // length of lmp
    k = 0; // next bit position to examine is k+1
    z = root; // root of PTST
    while (z != null) {
        if (d == point(z))
            return max {k, z->longest( )};
        bit(z)->searchBitVector(d,hp,k);
        if (d <point(z))
            z = leftChild(z);
        else
            z = rightChild(z);
    }
    return hp;
}
```

The entire tree is searched in the above described manner to find the priority of the highest prefix. After searching the tree, the routine returns the highest priority value.

Insertions and deletions are accomplished in a manner similar to that disclosed for the PBOB tree for an HPPT. However, rather than inserting or deleting a prefix from a node array, the bit in the bit vector of the selected node corresponding to the length of the prefix being added or deleted is set to 1 for insertion or 0 for deletion. Essentially, rather than inserting or deleting a prefix from an ALL(z), bit(z)[l] is set wherein l is the length of the prefix being inserted or deleted, to 1 or 0, respectively. Further, for the rotation, the largest integer iMax is found such that the prefix that corresponds to bit(x)[iMax] matches point(y). The first (bit 0 comes before bit 1) iMax bits of bit'(y) are the first iMax bits of bit(x) and the remaining bits of bit'(y) are the same as the corresponding bits of bit(y). bit'(x) is obtained from bit(x) by setting its first iMax bits to 0.

As a result of using LMPBOB trees for LMPT-type dynamic routers in a prefix partition, lookup, insert, and delete times are advantageously reduced. Specifically, the complexity of the disclosed PBOB operations are O(W) for lookup, with the number of cache misses O(log n), O(log (Wn)) for insert, and delete, with the number of cache misses O(log n).

EXAMPLE 5

Implementation

In an embodiment, the current tree structures and methods are implemented in C++. Because the C++ built-in functions of new and delete are prohibitively time consuming, memory management methods were designed to maintain a list of free memory and the new routine used only to retrieve a block of memory as needed.

In the PBOB embodiment, each node of the PTST has the following fields: color, point(z), ALL (including subfields pLength and priority), size, length, leftChild and rightChild, where ALL is a one-dimensional array, each entry of which has the subfields pLength and priority, size is the dimension of the array, and length is the number of pairs currently in the array linear list. The array ALL initially had enough space to accommodate 4 pairs (pLength, priority). When the capacity of an ALL is exceeded, the size of the ALL is increased by 4 pairs.

In addition, to improve the lookup performance, the field maxPriority (maximum priority of the prefixes in ALL(z)) may be added. The field minSt (smallest starting point of the prefixes in ALL(z)) and maxFn (largest finish point of the prefixes in ALL(z)) are easily computed from point(z) and the pLength of the shortest (i.e., first) prefix in ALL(z). By way of example, where 1 byte is allocated for each of the fields: color, size, length, maxPriority, pLength, and priority; and 4 bytes for the remaining fields, the initial size of a PTST node of PBOB is 24 bytes.

For the doubly-linked lists of PTST nodes with an empty ALL, 8 bytes of memory were used to allocate the empty array ALL to, respectively, represent left and right pointers. Because an instance of PBOB may have up to 2n PTST nodes, the minimum space/memory required by these 2n PTST nodes is 24*2n=48n bytes. However, some PTST nodes may have more than 4 pairs in their ALL. In one embodiment, there can be at most n/5 such nodes. Thus, according to this embodiment, the maximum memory requirements for a PBOB are 48n+8n/5=49.6n bytes.

In the LMPBOB embodiment, each node of the PTST has the following fields: color, point(z), bit, leftChild and rightChild. In addition, to improve the lookup performance of PBOB, the fields minLength (minimum of lengths of prefixes in bit(z)) and maxLength (largest finish point of the prefixes in bit(z)) may be added. These fields, minSt and maxLength can be computed from point(z) and minLength. By way of example for Ipv4, 1 byte is allocated for each of the fields: color, minLength, and maxLength; 8 bytes allocated for bit; and 4 bytes for each of the remaining fields, the size of a PTST node of LMPBOB is 23 bytes. As described above, to easily align PTST nodes along 4-byte boundaries, an LMP PTST node is padded so that its size is 24 bytes.

For the doubly-linked lists of PTST nodes with an empty bit vector, 8 bytes of memory were used to allocate the empty bit vector bit to represent left and right pointers. Thus, no space overhead was associated with maintaining the two doubly-linked lists of PTST nodes that have an empty bit. Further, because an instance of LMPBOB may have up to 2n PTST nodes, the space/memory required by these 2n PTST nodes is 24*2=48n bytes.

EXAMPLE 6

Results

Figures 18, 19:
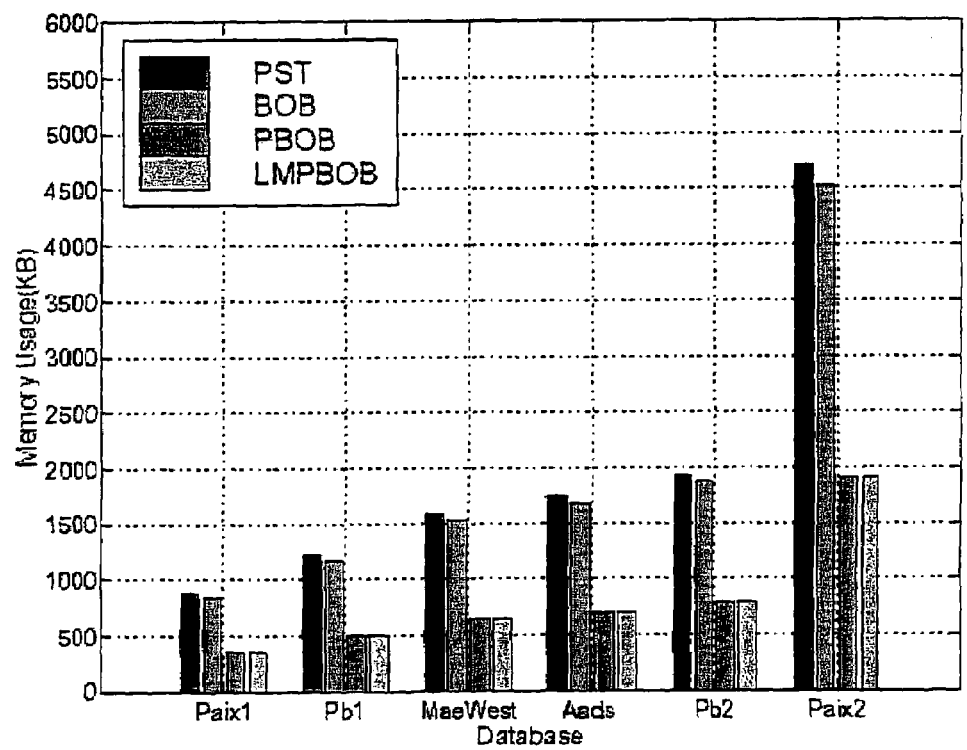
FIG. 18 is a table tabulating the memory usage of a BOB, PBOB, and a LMPBOB of the current invention compared to a PST data structure.
FIG. 19 is a graph illustrating the memory usage of BOB, PBOB, and LMPBOB data structures after inserting all prefixes compared to a PST data structure.
Figure 20:
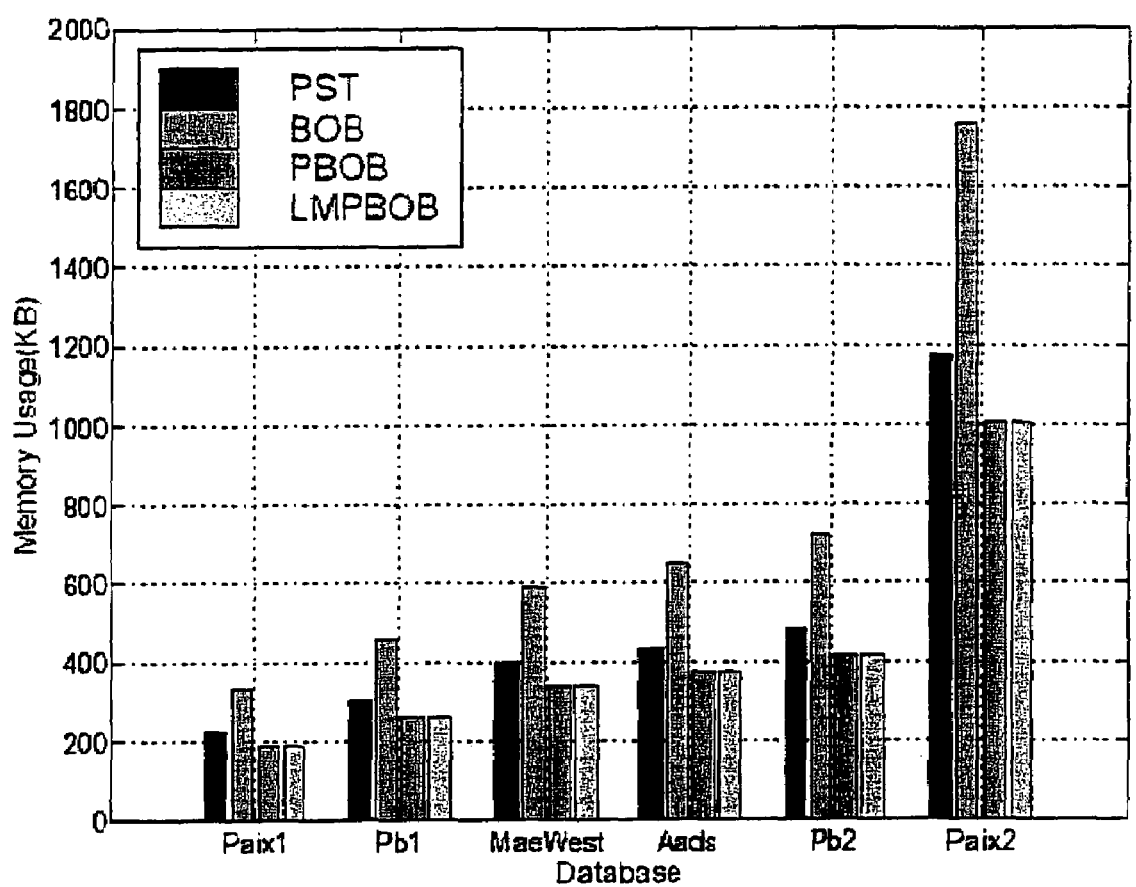
FIG. 20 is a graph illustrating the memory usage of BOB, PBOB, and LMPBOB data structures after inserting all prefixes then removing 75% compared to a PST data structure.

An implementation of the current invention using an 1.4 GHz Pentium 4 Personal Computer having 256 KB L2 cache will now be presented. The preceding method for prefix matching in a prefix partition using PSTs was incorporated into a C++ program running on a 1.4 GHz Pentium 4 PC and the resulting performance compared to a method using PST's in general. For the test, databases of Internet Protocol, Version 4 (IPv4) packets, including Paix1, Pb1, MaeWest, Aads, Pb2, and Paix2, were used. Two memory measurements were performed: Measure1 and Measure2. Measure1 measured the memory used by a data structure that is the result of a series of insertions made into an initially empty instance of the data structure. By way of example, with Measure1 less than 1% of the PTST-nodes in the constructed data structures (i.e., PBOB and LMPBOB). Measure 2 measured the memory used after 75% of the prefixes in the data structure constructed for Measure1 were deleted. The results of the test are shown in FIG. 18 and also plotted as graphs in FIGS. 19 and 20.

With regard to the performance speed, timing measurements were performed for lookup times in PBOB and LMPBOB data structures. The mean time to find the longest matching prefix was analyzed. A PBOB and LMPBOB containing all the prefixes of a prefix database were created. Next, a random permutation of the set of start points of the ranges corresponding to the prefixes was obtained. The resulting permutation determined the order in which to search for the longest matching prefix for each of the start points. The time required to determine all of the longest matching prefixes was measured and averaged over the number of start points.

Figure 22:
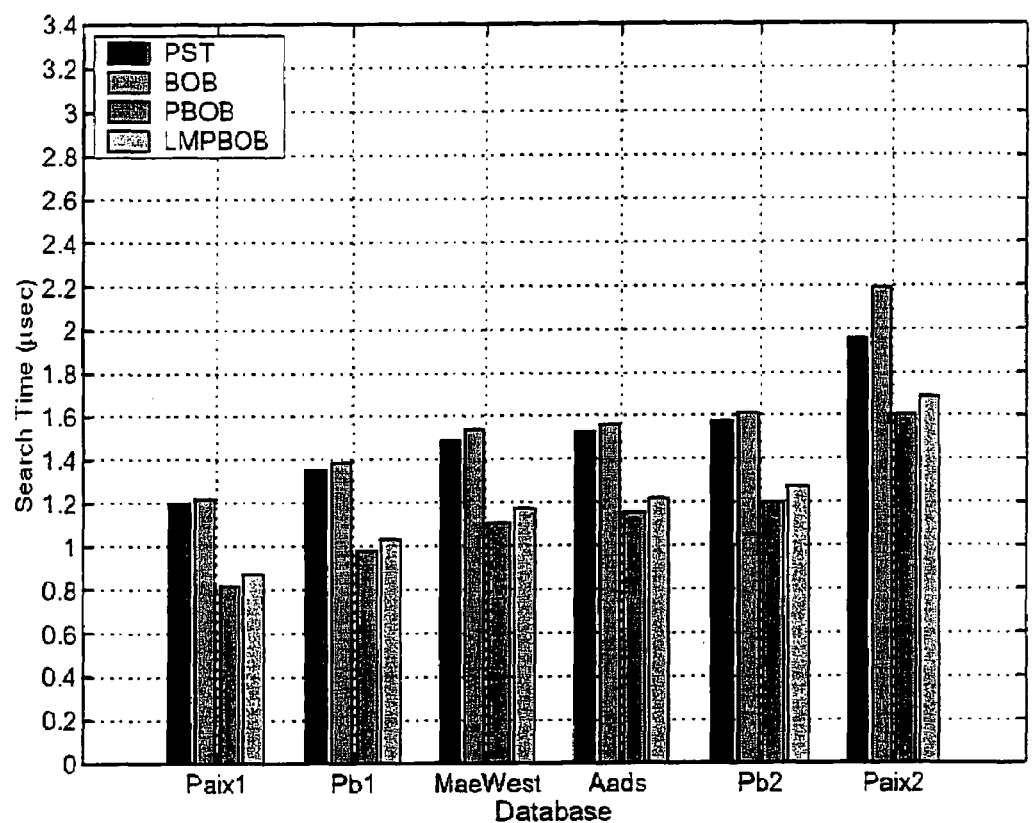
FIG. 22 is a graph illustrating the search times for BOB, PBOB, and LMPBOB data structures as compared to a PST data structure.

The results of the comparison between the prefix matching times for the PBOB and LMPBOB structures and a PST structure are shown in FIGS. 21 and 22. Notably, the PBOB and LMPBOB structure lookup times are 20%-30% faster than the PST lookup times.

Figure 23:
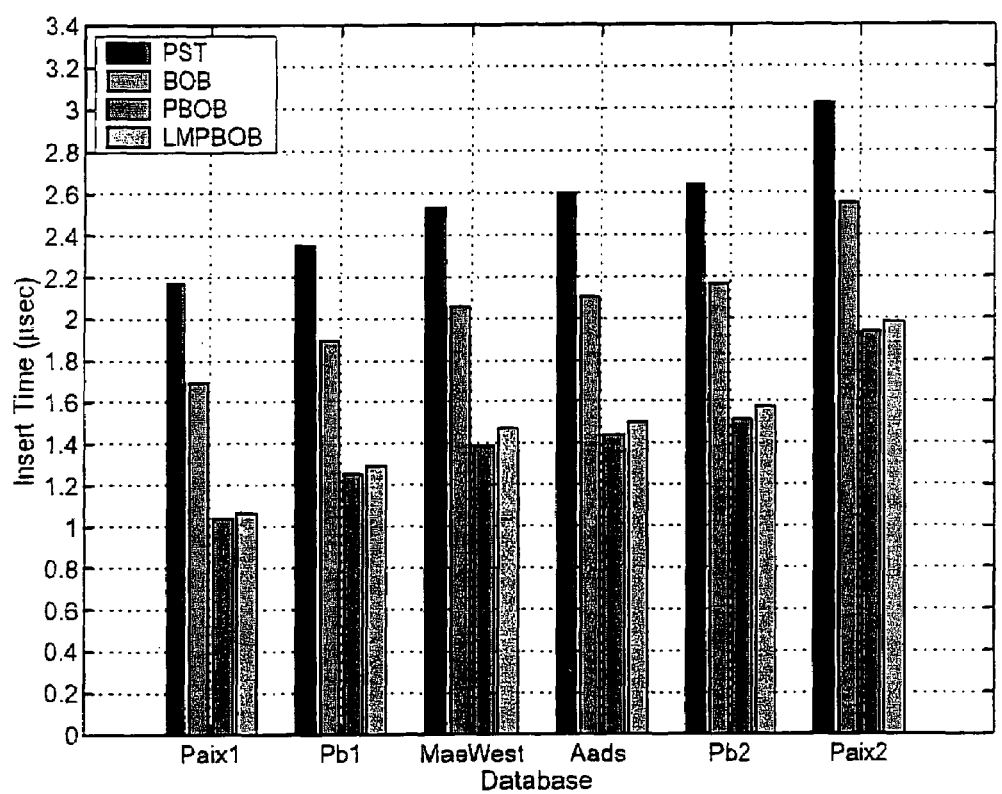
FIG. 23 is a graph illustrating the insert times for BOB, PBOB, and LMPBOB data structures compared to a PST data structure.

Insertion and deletion times were also characterized and compared. To obtain the mean time to insert a prefix, a group of prefixes were randomly permuted and the first 67% of the prefixes were inserted into an initially empty data structure. Then, the time to insert the remaining 33% of the prefixes into the data structure was measured and the mean insertion time computed. The results in FIG. 23 show that insertion times for the PBOB and LMPBOB structures were 40% to 60% of the insertion time required using a PST structure.

Figure 24:
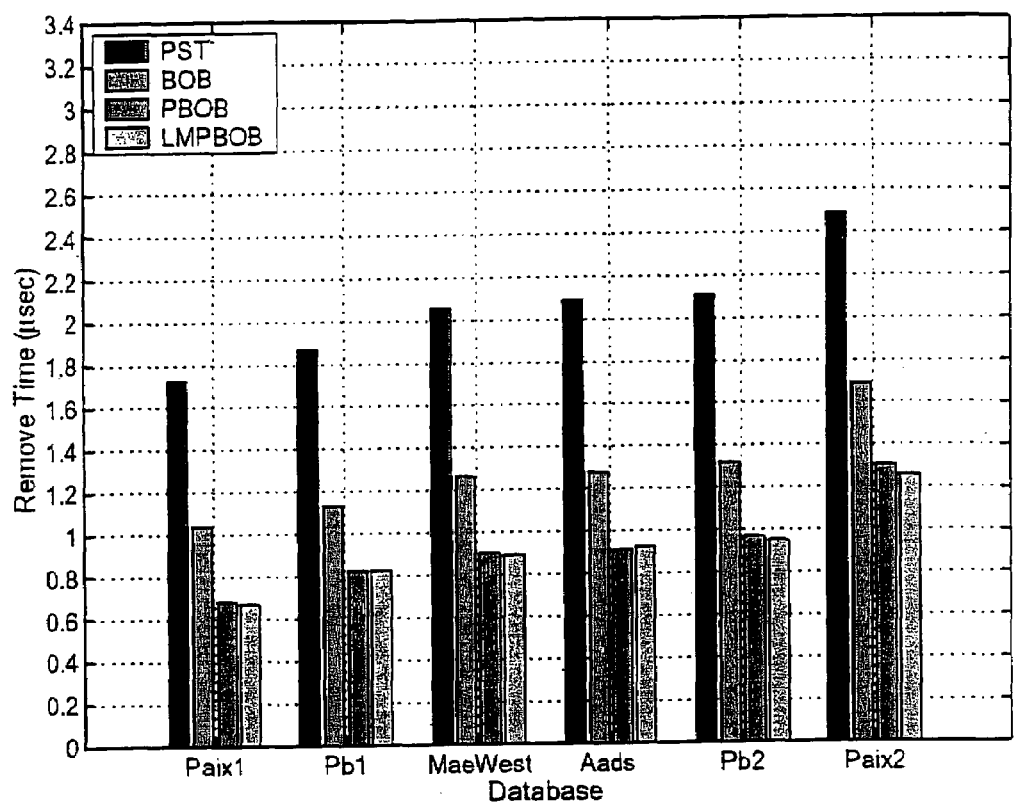
FIG. 24 is a graph illustrating the delete times for BOB, PBOB, and LMPBOB data structures compared to a PST data structure.

Finally, the deletion times were compared by measuring the time required to delete 33% of the prefixes from a data structure. The results, as shown in FIG. 24, show that deletion times for the BOB and PBOB structures were 50% less than the deletion times required using an PST structure, while deletions from the BOB took 40% less time than deletions from the PST.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, programmable logic device, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, including programmable logic devices, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

It should be understood that the examples and embodiments described herein are for illustrative purposes only and that various modifications or changes in light thereof will be suggested to persons skilled in the art and are to be included within the spirit and purview of this application.

We claim:

1. A method for improving routing operations in dynamic routing tables comprising:
    (a) establishing s to be used in a prefix partitioning scheme, wherein s denotes a pre-established value of bits of the prefixes;
    (b) partitioning at least one prefix into up to min(n, $2^s+1$) partitions, where n is the total number of prefixes;
    (c) assessing prefixes length with regard to s;
    (d) storing the prefix whose length is larger than or equal to s in a partition that corresponds to the value of the prefix's first s bit;
    (e) storing prefixes whose length is smaller than s in a first designated partition;
    (f) representing the prefixes in each partition using a router table data structure; and
    (g) performing an operation selected from lookup, insert, and delete by using the stored prefixes.

2. The method according to claim 1, wherein the representative router table structure is a dynamic router-table data structure.

3. The method according to claim 2, wherein the dynamic router-table data structure is selected from a group consisting of BOB; PBOB; LMPBOB; B-tree data structure; CRBT; ACRBT; PST; HOT; BOT, and one bit TRIE.

4. The method according to claim 1, wherein the representative router table structure is a static router-table data structure.

5. The method according to claim 4, wherein the static router-table data structure is selected from a group consisting of a linear array; trie-based data structures; and hash trees organized by prefix length.

6. The method according to claim 1, further comprising the steps of:
    (a) establishing t to be used for further partitioning the prefixes whose length is smaller than s, where t denotes a second pre-established value of bits of the prefixes;
    (b) assessing the length of the prefixes stored in the designated partition with regard to t;
    (c) partitioning at least one of the prefixes whose length is larger than or equal to t in up to min (n, $2^t+1$) partitions, wherein the prefix whose length is smaller than s and larger than or equal to t is placed in a partition based on the value of the prefix's first t bit; and
    (d) storing the prefixes whose length is smaller than s and t into a second designated partition.

7. The method according to claim 1, further comprising the step of indexing nonempty partitions using an array or a hash table.

8. A computer program product recorded on computer readable medium for routing packets comprising: a computer readable medium for receiving packets specifying prefixes and decision rules for the prefixes; a computer readable medium for establishing s bits to be used in a prefix partitioning scheme; a computer readable medium for matching, inserting, or deleting prefixes in a partitioning tree; and a computer readable medium for performing steps of multilevel partitioning, said steps comprising:
    (a) establishing s to be used in a prefix partitioning scheme, where s denotes a pre-established value of bits of the prefixes;
    (b) partitioning at least one prefix into up to min(n, $2^s+1$) partitions, where n is the total number of prefixes;
    (c) assessing prefix length with regard to s;
    (d) storing prefixes whose length is larger than s in a partition that corresponds to the value of the prefix's first s bit;
    (e) storing prefixes whose length is smaller than s in a first designated partition; and
    (f) representing the prefixes in each partition using a router table data structure.

9. The computer program according to claim 8, wherein the dynamic router-table data structure is selected from a group consisting of BOB; PBOB; LMPBOB; B-tree data structure; CRBT; ACRBT; PST; HOT; and BOT.

10. The computer program according to claim 8, wherein the representative router-table structure is a static router-table data structure.

11. The computer program according to claim 10, wherein the static router-table data structure is selected from a group consisting of a linear array; trie-based data structures; and hash trees organized by prefix length.

12. The computer program according to claim 8, wherein the computer readable medium for performing the steps of multilevel partitioning further comprises the steps of:
    (a) establishing t to be used for further partitioning the prefixes whose length is smaller than s, where t denotes a second pre-established value of the bits of the prefixes;
    (b) assessing the length of the prefixes stored in the designated partition with regard to t;
    (c) partitioning at least one of the prefixes whose length is larger than or equal to t in up to min (n, $2^t+1$) partitions, wherein the prefix whose length is smaller than s and greater than or equal to t, is placed in a partition based on the value of the prefix's first t bit; and
    (d) storing the prefixes whose length is smaller than s and t into additional bits into a second designated partition.

13. A computer system comprising: a memory containing a partitioning routing table constructing program having functions for constructing a routing table with partitions based on the first s bits of a prefix, where s denotes a pre-established value of the bits of the prefix; wherein the prefixes in each partition are represented by a router table data structure; and a processor for executing the partitioning routing table constructing program.

14. The computer system according to claim 13, wherein the partitioning routing table constructing program further includes functions for constructing partitions based on the first t bits of a prefix, where t denotes a second pre-established value of bits of the prefix.

* * * * *

UNITED STATES PATENT AND TRADEMARK OFFICE
CERTIFICATE OF CORRECTION

PATENT NO. : 7,444,318 B2  
APPLICATION NO. : 10/719914  
DATED : October 28, 2008  
INVENTOR(S) : Sartaj Kumar Sahni and Haibin Lu It is certified that error appears in the above-identified patent and that said Letters Patent is hereby corrected as shown below:

<u>Cover page,</u>
Column 1,
"(65) Prior Publication Data
  US 2004/0258061 A1   Dec. 23, 2004

(51) Int. Cl.
    *G06F 7/00*   (2006.01)
    *G06F 17/30*   (2006.01)"

should read

--(65) Prior Publication Data
  US 2004/0258061 A1   Dec. 23, 2004

Related U.S. Application Data
  (63) Application No. 10/613,963, filed on Jul. 3, 2003, now U.S. Patent No. 7,509,300.

(60) Provisional application No. 60/393,445, filed Jul. 3, 2002.

(51) Int. Cl.
    *G06F 7/00*   (2006.01)
    *G06 F17/30*   (2006.01)--.

<u>Column 3,</u>
Line 30, "O(T)" should read --$O(W)$--.

<u>Column 7,</u>
Line 14, "less than s 3 fall" should read --less than *s* 3 fall--.

<u>Column 8,</u>
Line 34, "partition -150." should read --partition –1 50.--.

<u>Column 9,</u>
Line 39, "I 24," should read --$i \geq 0$,--.

UNITED STATES PATENT AND TRADEMARK OFFICE
CERTIFICATE OF CORRECTION

PATENT NO. : 7,444,318 B2
APPLICATION NO. : 10/719914
DATED : October 28, 2008
INVENTOR(S) : Sartaj Kumar Sahni and Haibin Lu It is certified that error appears in the above-identified patent and that said Letters Patent is hereby corrected as shown below:

Column 14,
Line 8, "MULTIBITh" should read --MULTIBITb--.
Line 11, "that of MULTIBITh" should read --that of MULTIBITb--.
Line 12, "and in MULTIBITh" should read --and in MULTIBITb--.

Column 18,

Line 15, " $\sum_{j=0}^{i} s_j,$ " should read -- $\sum_{j=0}^{I} s_j$ , --.

Column 26,
Line 61, "O(logn+maxR)=O(g)" should read --$O(\log n + maxR) = O(W)$--.

Column 31,
Line 20, "storing the prefix" should read --storing prefixes--.

Column 32,
Line 37, "value of the bits" should read --value of bits--.
Line 51, "value of the bits" should read --value of bits--.

Signed and Sealed this

Twenty-ninth Day of September, 2009

David J. Kappos
*Director of the United States Patent and Trademark Office*